US011503458B1

(12) United States Patent
Elshafie et al.

(10) Patent No.: US 11,503,458 B1
(45) Date of Patent: Nov. 15, 2022

(54) POWER SPLITTING FOR ENERGY HARVESTING WIRELESS DEVICES

(71) Applicant: QUALCOMM Incorporated, San Diego, CA (US)

(72) Inventors: Ahmed Elshafie, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 17/245,924

(22) Filed: Apr. 30, 2021

(51) Int. Cl.
*H04W 8/24* (2009.01)
*H04L 5/00* (2006.01)
*H04W 24/10* (2009.01)
*H02J 50/20* (2016.01)
*H04W 52/18* (2009.01)
*H02J 50/00* (2016.01)
*H04W 72/04* (2009.01)

(52) U.S. Cl.
CPC ............. *H04W 8/24* (2013.01); *H02J 50/001* (2020.01); *H02J 50/20* (2016.02); *H04L 5/0048* (2013.01); *H04W 24/10* (2013.01); *H04W 52/18* (2013.01); *H04W 72/042* (2013.01)

(58) Field of Classification Search
CPC ....... H04W 8/24; H04W 24/10; H04W 52/18; H04W 72/042; H02J 50/20; H02J 50/001; H04L 5/0048
See application file for complete search history.

(56) References Cited

U.S. PATENT DOCUMENTS

| | | | |
|---|---|---|---|
| 11,310,749 B2 * | 4/2022 | Lee ..................... | H04W 52/367 |
| 11,323,987 B2 * | 5/2022 | Kim ..................... | H04W 52/325 |
| 2022/0104149 A1 * | 3/2022 | Takeda ................ | H04W 52/146 |
| 2022/0182950 A1 * | 6/2022 | Huang ............... | H04W 72/1263 |

* cited by examiner

*Primary Examiner* — Chandrahas B Patel
(74) *Attorney, Agent, or Firm* — Holland and Hart

(57) ABSTRACT

Methods, systems, and devices for wireless communications are described. In some examples, a user equipment (UE) may transmit a message indicating a capability of the UE to support power splitting for signals received at the UE for EH by the UE. In some examples, the UE may transmit, based on the capability of the UE to support power splitting, an indication of a power splitting factor for EH by the UE, the power splitting factor indicating a portion of received power for signals received at the UE to be used for EH. The UE may receive a signal to use for power splitting based at least in part on the capability of the UE to support power splitting for signals received at the UE for EH by the UE and the power splitting factor.

30 Claims, 16 Drawing Sheets

POWER SPLITTING FOR ENERGY HARVESTING WIRELESS DEVICES

FIELD OF TECHNOLOGY

The following relates to wireless communications, including power splitting (PS) for energy harvesting (EH) wireless devices.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications system, a wireless device may perform radio frequency (RF) energy harvesting (EH), which allows the wireless device to harvest or store energy from RF signals. The wireless device may implement a power splitting (PS) scheme in which received RF signals are split into two streams, one for an information receiver and one for an EH receiver. Some methods for such PS schemes may be deficient.

SUMMARY

The described techniques relate to improved methods, systems, devices, and apparatuses that support power splitting (PS) for energy harvesting (EH) wireless devices. A user equipment (UE) may transmit a message that may indicate a capability of the UE to support PS for signals received at the UE for EH by the UE. The UE may transmit an indication of a PS factor for EH by the UE. In some examples, transmitting the indication of the PS factor may be based on the capability of the UE to support PS for signals received at the UE for EH by the UE. In some examples, the PS factor may indicate a portion of received power for signals received at the UE to be used for EH at the UE. The UE may receive a signal to use for PS for EH by the UE based on the PS factor.

A method for wireless communications at a UE is described. The method may include transmitting a message indicating a capability of the UE to support PS for signals received at the UE for EH by the UE, transmitting, based on the capability of the UE to support PS for signals received at the UE for EH by the UE, an indication of a PS factor for EH by the UE, the PS factor indicating a portion of received power for signals received at the UE to be used for EH, and receiving a signal to use for PS based on the capability of the UE to support PS for signals received at the UE for EH by the UE and the PS factor.

An apparatus for wireless communications at a UE is described. The apparatus may include a processor, memory coupled with the processor, and instructions stored in the memory. The instructions may be executable by the processor to cause the apparatus to transmit a message indicating a capability of the UE to support PS for signals received at the UE for EH by the UE, transmit, based on the capability of the UE to support PS for signals received at the UE for EH by the UE, an indication of a PS factor for EH by the UE, the PS factor indicating a portion of received power for signals received at the UE to be used for EH, and receive a signal to use for PS based on the capability of the UE to support PS for signals received at the UE for EH by the UE and the PS factor.

Another apparatus for wireless communications at a UE is described. The apparatus may include means for transmitting a message indicating a capability of the UE to support PS for signals received at the UE for EH by the UE, means for transmitting, based on the capability of the UE to support PS for signals received at the UE for EH by the UE, an indication of a PS factor for EH by the UE, the PS factor indicating a portion of received power for signals received at the UE to be used for EH, and means for receiving a signal to use for PS based on the capability of the UE to support PS for signals received at the UE for EH by the UE and the PS factor.

A non-transitory computer-readable medium storing code for wireless communications at a UE is described. The code may include instructions executable by a processor to transmit a message indicating a capability of the UE to support PS for signals received at the UE for EH by the UE, transmit, based on the capability of the UE to support PS for signals received at the UE for EH by the UE, an indication of a PS factor for EH by the UE, the PS factor indicating a portion of received power for signals received at the UE to be used for EH, and receive a signal to use for PS based on the capability of the UE to support PS for signals received at the UE for EH by the UE and the PS factor.

In some examples of the method, apparatuses, and non-transitory computer-readable medium described herein, receiving the signal to use for PS may include operations, features, means, or instructions for receiving the signal from a base station or a second UE in sidelink communication with the UE, where a transmit power of the signal may be based on the PS factor.

In some examples of the method, apparatuses, and non-transitory computer-readable medium described herein, transmitting the message may include operations, features, means, or instructions for transmitting the message to a base station in communication with the UE.

In some examples of the method, apparatuses, and non-transitory computer-readable medium described herein, receiving the signal to use for PS may include operations, features, means, or instructions for receiving the signal from the base station, where a modulation and coding scheme of the signal may be based on the PS factor.

In some examples of the method, apparatuses, and non-transitory computer-readable medium described herein, transmitting the message may include operations, features, means, or instructions for transmitting the message to a second UE in sidelink communication with the UE.

Some examples of the method, apparatuses, and non-transitory computer-readable medium described herein may further include operations, features, means, or instructions for receiving a request for the PS factor from the second UE, where the indication of the PS factor may be transmitted in response to the request.

Some examples of the method, apparatuses, and non-transitory computer-readable medium described herein may further include operations, features, means, or instructions for transmitting the indication of the PS factor to a base station and refraining from using the PS factor for transmission of a sounding reference signal to the base station.

Some examples of the method, apparatuses, and non-transitory computer-readable medium described herein may further include operations, features, means, or instructions for receiving, from a base station, a reference signal for performing channel quality measurements at the UE and transmitting, to the base station, a channel quality report indicating one or more channel quality measurements performed at the UE based on the PS factor.

Some examples of the method, apparatuses, and non-transitory computer-readable medium described herein may further include operations, features, means, or instructions for receiving, from a base station, an updated PS factor based on transmitting the indication of the PS factor to the base station and receiving, from the base station, a modulation and coding scheme for receiving the signal based on the updated PS factor, where the signal may be received based on the modulation and coding scheme and the updated PS factor.

Some examples of the method, apparatuses, and non-transitory computer-readable medium described herein may further include operations, features, means, or instructions for receiving a downlink control information (DCI) message that indicates the updated PS factor, the modulation and coding scheme, or both.

In some examples of the method, apparatuses, and non-transitory computer-readable medium described herein, the PS factor may be based on a reliability associated with a channel used for receiving the signal, a transport block size of the signal, or both.

A method for wireless communications at a first UE is described. The method may include receiving a message from a second UE, the message indicating a capability of the second UE to support PS for signals received at the second UE for EH by the second UE, transmitting a request for a PS factor from the second UE based on the capability of the second UE to support PS for signals received at the second UE for EH by the second UE, and transmitting, in response to the request, an indication of the PS factor for EH by the second UE, the PS factor indicating a portion of received power for signals received at the second UE to be used for EH.

An apparatus for wireless communications at a first UE is described. The apparatus may include a processor, memory coupled with the processor, and instructions stored in the memory. The instructions may be executable by the processor to cause the apparatus to receive a message from a second UE, the message indicating a capability of the second UE to support PS for signals received at the second UE for EH by the second UE, transmit a request for a PS factor from the second UE based on the capability of the second UE to support PS for signals received at the second UE for EH by the second UE, and transmit, in response to the request, an indication of the PS factor for EH by the second UE, the PS factor indicating a portion of received power for signals received at the second UE to be used for EH.

Another apparatus for wireless communications at a first UE is described. The apparatus may include means for receiving a message from a second UE, the message indicating a capability of the second UE to support PS for signals received at the second UE for EH by the second UE, means for transmitting a request for a PS factor from the second UE based on the capability of the second UE to support PS for signals received at the second UE for EH by the second UE, and means for transmitting, in response to the request, an indication of the PS factor for EH by the second UE, the PS factor indicating a portion of received power for signals received at the second UE to be used for EH.

A non-transitory computer-readable medium storing code for wireless communications at a first UE is described. The code may include instructions executable by a processor to receive a message from a second UE, the message indicating a capability of the second UE to support PS for signals received at the second UE for EH by the second UE, transmit a request for a PS factor from the second UE based on the capability of the second UE to support PS for signals received at the second UE for EH by the second UE, and transmit, in response to the request, an indication of the PS factor for EH by the second UE, the PS factor indicating a portion of received power for signals received at the second UE to be used for EH.

Some examples of the method, apparatuses, and non-transitory computer-readable medium described herein may further include operations, features, means, or instructions for transmitting a sidelink message to the second UE using a transmit power that may be based on the PS factor.

Some examples of the method, apparatuses, and non-transitory computer-readable medium described herein may further include operations, features, means, or instructions for transmitting a sidelink message to the second UE using a modulation and coding scheme that may be based on the PS factor.

Some examples of the method, apparatuses, and non-transitory computer-readable medium described herein may further include operations, features, means, or instructions for receiving a sidelink control message that includes the indication of the PS factor, where the sidelink control message includes a PC5 control message.

A method for wireless communications at a base station is described. The method may include receiving a message from a UE, the message indicating a capability of the UE to support PS for signals received at the UE for EH by the UE, receiving, based on the capability of the UE to support PS for signals received at the UE for EH by the UE, an indication of a PS factor for EH by the UE, the PS factor indicating a portion of received power for signals received at the UE to be used for EH, and transmitting a signal to the UE based on the capability of the UE to support PS for signals received at the UE for EH by the UE and the PS factor.

An apparatus for wireless communications at a base station is described. The apparatus may include a processor, memory coupled with the processor, and instructions stored in the memory. The instructions may be executable by the processor to cause the apparatus to receive a message from a UE, the message indicating a capability of the UE to support PS for signals received at the UE for EH by the UE, receive, based on the capability of the UE to support PS for signals received at the UE for EH by the UE, an indication of a PS factor for EH by the UE, the PS factor indicating a portion of received power for signals received at the UE to be used for EH, and transmit a signal to the UE based on the capability of the UE to support PS for signals received at the UE for EH by the UE and the PS factor.

Another apparatus for wireless communications at a base station is described. The apparatus may include means for receiving a message from a UE, the message indicating a capability of the UE to support PS for signals received at the UE for EH by the UE, means for receiving, based on the capability of the UE to support PS for signals received at the UE for EH by the UE, an indication of a PS factor for EH by the UE, the PS factor indicating a portion of received power for signals received at the UE to be used for EH, and means for transmitting a signal to the UE based on the capability of the UE to support PS for signals received at the UE for EH by the UE and the PS factor.

A non-transitory computer-readable medium storing code for wireless communications at a base station is described. The code may include instructions executable by a processor to receive a message from a UE, the message indicating a capability of the UE to support PS for signals received at the UE for EH by the UE, receive, based on the capability of the UE to support PS for signals received at the UE for EH by the UE, an indication of a PS factor for EH by the UE, the PS factor indicating a portion of received power for signals received at the UE to be used for EH, and transmit a signal to the UE based on the capability of the UE to support PS for signals received at the UE for EH by the UE and the PS factor.

In some examples of the method, apparatuses, and non-transitory computer-readable medium described herein, transmitting the signal may include operations, features, means, or instructions for transmitting the signal using a transmit power that may be based on the PS factor, a modulation and coding scheme that may be based on the PS factor, a rank indicator that may be based on the PS factor, or any combination thereof.

Some examples of the method, apparatuses, and non-transitory computer-readable medium described herein may further include operations, features, means, or instructions for transmitting, to the UE, a reference signal for performing channel quality measurements at the UE and receiving, from the UE, a channel quality report indicating one or more channel quality measurements performed at the UE based on the PS factor.

Some examples of the method, apparatuses, and non-transitory computer-readable medium described herein may further include operations, features, means, or instructions for receiving a sounding reference signal from the UE and estimating the channel for communication with the UE based on the sounding reference signal and the PS factor.

Some examples of the method, apparatuses, and non-transitory computer-readable medium described herein may further include operations, features, means, or instructions for transmitting, to the UE, an updated PS factor based on the indication of the PS factor and transmitting, to the UE, a modulation and coding scheme for receiving the signal based on the updated PS factor, where the signal may be transmitting based on the modulation and coding scheme and the updated PS factor.

Some examples of the method, apparatuses, and non-transitory computer-readable medium described herein may further include operations, features, means, or instructions for transmitting a DCI message that indicates the updated PS factor, the modulation and coding scheme, or both.

DETAILED DESCRIPTION

Wireless radio frequency (RF) EH (EH) allows a device to harvest or store energy from RF signals. Instead of solely using the received RF signals to receive data, at least a portion of the RF signal may be converted into energy that may be used for device operation or stored by the device for later use (e.g., in a battery).

Some EH techniques utilize one antenna system for communication, and another antenna system for EH. Other techniques utilize a single antenna system for both communication and EH. Some of these techniques with a combined architecture utilize a power splitting (PS) scheme in which received RF signals are split into two streams, one for an information receiver and one for an EH receiver. However, in some situations, PS RF EH may interfere with communication procedures, which may result in poor EH efficiency or lost communications.

To increase both RF EH as well as communication efficiency, devices capable of RF EH may report such a capability to other devices. For example, the device may report a PS factor to other devices, to aid in modulation and coding scheme (MCS) selection, channel state information reference signal (CSI-RS) signal to noise and interference ratio (SINR) computation, and selection of the PS factor itself.

In some examples, a second device such as a base station or another UE, may, in response to receiving such a report, boost the power of its transmissions to allow the first device to more efficiently perform RF EH. In examples involving a base station, the base station may also select an MCS or compute a CSI-RS SINR in response to receiving the report. A downlink control information (DCI) transmission may be sent from a base station to indicate a power factor for the device to use, which may enable dynamic adjustments to the PS scheme based on reliability and transport block size, among other factors. Such techniques may lead to more efficient communications and energy storage for EH capable devices.

Aspects of the disclosure are initially described in the context of wireless communications systems. Aspects of the disclosure are then illustrated by system diagrams and process flows. Aspects of the disclosure are further illustrated by and described with reference to apparatus diagrams, system diagrams, and flowcharts that relate to PS for EH wireless devices.

Figure 1:
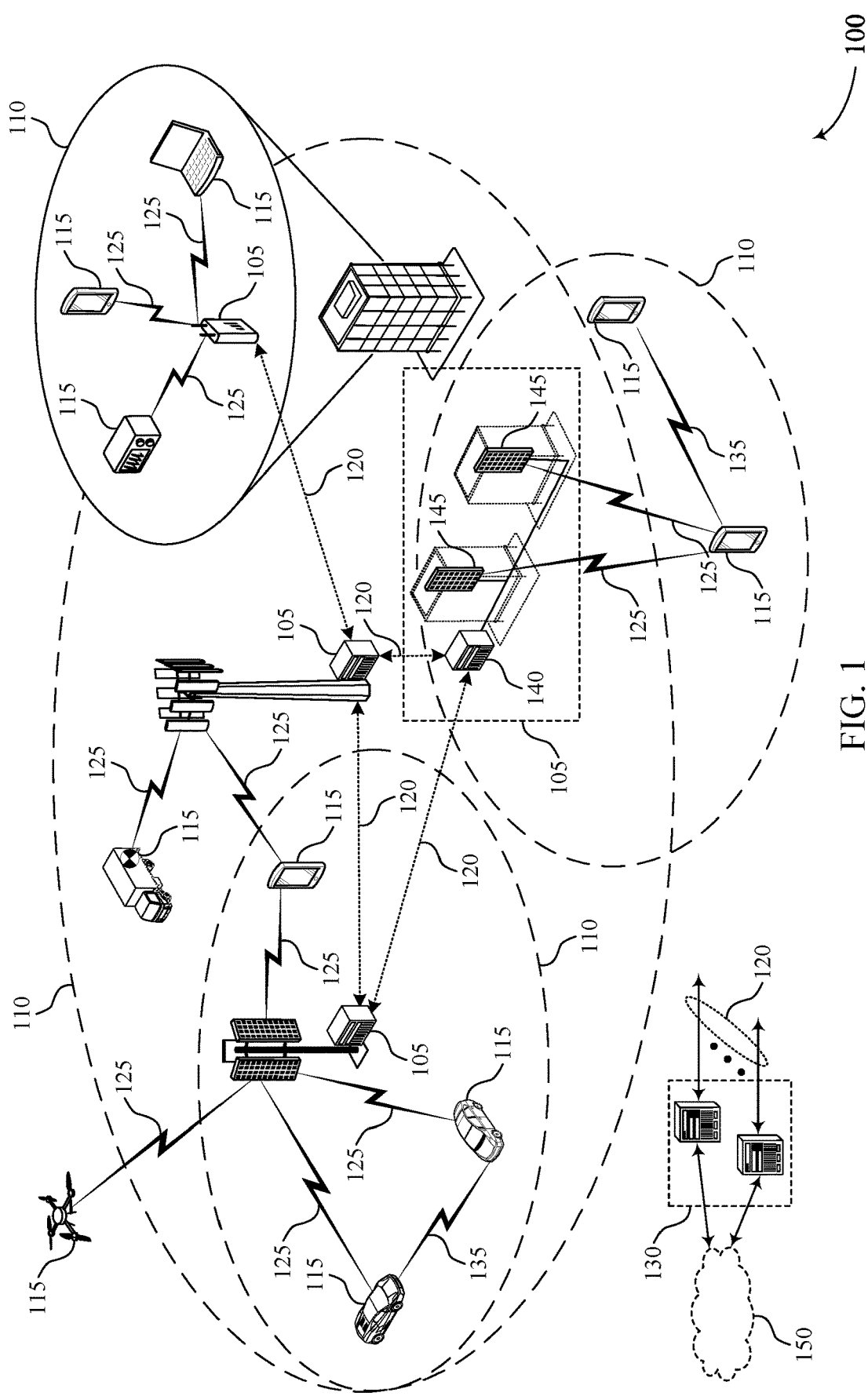
FIG. 1 illustrates an example of a wireless communications system that supports power splitting (PS) for EH (EH) wireless devices in accordance with aspects of the present disclosure.

FIG. 1 illustrates an example of a wireless communications system 100 that supports PS for EH wireless devices (e.g. a user equipment (UE)) in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, the wireless devices may implement one or more techniques for PS in devices capable of RF EH. For example, a UE 115 may be configured to perform the various operations and techniques described herein. For example, a UE 115 may transmit a message that may indicate a capability of the UE 115 to support PS for signals (e.g., data signals, control signals, or other signals) received at the UE 115 for EH by the UE 115 (e.g., the UE 115 may transmit the message to a base station 105 or to another UE 115). For example, The UE 115 may transmit an indication of a PS factor for EH by the UE 115. In some examples, transmitting the indication of the PS factor may be based on the capability of the UE 115 to support PS for signals received at the UE 115 for EH by the UE 115. In some examples, the PS factor may indicate a portion of received power for signals received at the UE 115 to be used for EH (e.g., the PS factor may include a value between 0 and 1 that indicates a portion or corresponds to a percentage of energy of a received signal that may be used for EH). The UE 115 may receive a signal to use for PS based on the capability of the UE 115 to support PS for signals received at the UE 115 for EH by the UE 115 and the PS factor. As such, the UE 115 may employ a PS scheme for EH in wireless communications.

In some examples, a first UE 115 may receive a message from a second UE 115, and the message may indicate a capability of the second UE 115 to support PS for signals received at the second UE 115 for EH by the second UE 115. The first UE 115 may transmit a request for a PS factor from the second UE 115. Transmitting the request may be based on the capability of the second UE 115 to support PS for signals receives at the second UE 115 for EH by the second UE 115. The first UE 115 may receive, in response to the request, an indication of the PS factor for EH by the second UE 115 (e.g., through sidelink control information), the PS factor indicating a portion of received power for signals received at the second UE 115 to be used for EH. As such, the UE 115 may employ a PS scheme for EH in sidelink wireless communications.

Figure 2:
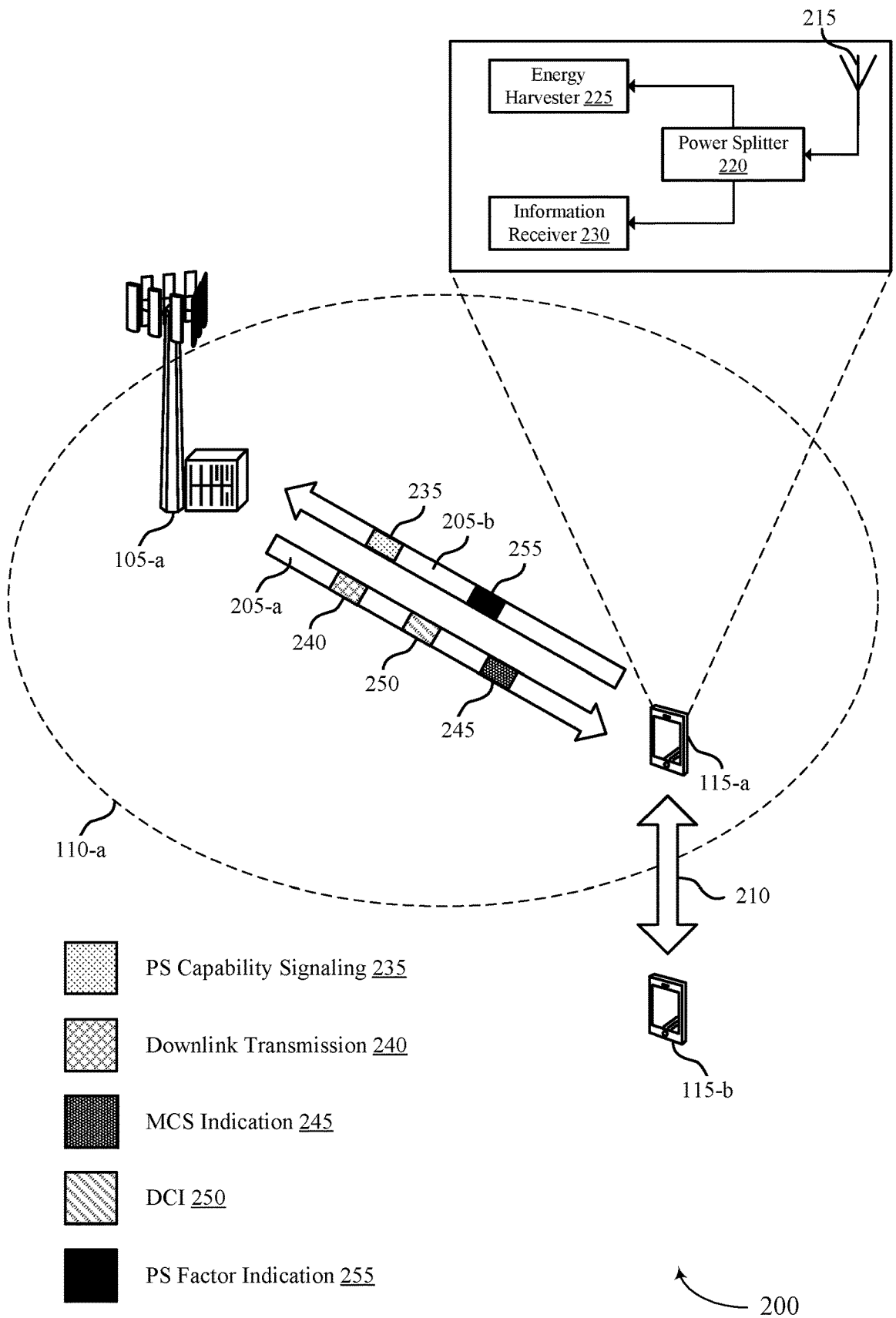
FIG. 2 illustrates an example of a wireless communications system that supports PS for EH wireless devices in accordance with aspects of the present disclosure.

FIG. 2 illustrates an example of a wireless communications system 200 that supports PS for EH wireless devices in accordance with aspects of the present disclosure. The wireless communications system 200 may include a base station 105-a, a UE 115-a, and a UE 115-b, which may be examples of the corresponding devices described herein.

In some examples, the base station 105-a may support communications for a UE 115-a in a geographic coverage area 110-a. The base station 105-a may communicate with the UE 115-a via one or more downlink communication links 205-a and one or more uplink communication links 205-b. In some examples, the UE 115-b may be located outside of the geographic coverage area 110-a, while in other examples, the UE 115-b may be located inside of the geographic coverage area 110-a. In some examples, UE 115-a may communicate with UE 115-b via one or more sidelink communication links 210. In some examples, the UE 115-a may be within the geographic coverage area 110-a of the base station 105-a while communicating with the UE 115-b (e.g., sidelink mode 1), and in other examples, the UE 115-a may be outside of the geographic coverage area 110-a of the base station 105-a while communicating with the UE 115-b (e.g., sidelink mode 2).

In some examples, the UE 115-a may include one or more antennas 215. The antennas 215 may be used for data transmission and reception, as well as reception of RF signals for EH. In some examples, the antennas 215 may be arranged in one or more antenna modules, and each antenna module may include one or more individual antennas. In some examples, the antennas 215 may be coupled to a power splitter 220. The power splitter 220 may split the RF signal received at the antennas 215 into two streams, and a portion of the RF signal may be directed to an energy harvester 225, while another portion of the RF signal may be directed to an information receiver 230. In some examples, the entirety of the RF signal may be directed to either the energy harvester 225 or the information receiver 230.

In some examples, the information receiver 230 may receive the portion of the RF signal directed to the information receiver 230 and receive transmissions (e.g., data messages, control messages, or other messages) for further decoding, recognition, or processing. In some examples, the energy harvester 225 may harvest energy from the portion of the RF signal directed to the energy harvester 225. In some examples, the energy harvester 225 may include one or more components, including one or more impedance matching circuits, one or more voltage multipliers, one or more capacitors, or a combination thereof to convert the received RF signal (or a portion thereof) into electricity (e.g., direct current (DC) or alternating current (AC)) to be distributed, stored (e.g., in a battery at the UE 115-a), or otherwise used by the UE 115-a. In some examples, the energy harvester 225 may include or may be coupled to a power management module, which may direct the harvested energy to energy storage or may direct the harvested energy to be used for information transmission with or without storing the harvested energy temporarily.

In some examples, the power splitter 220 may split the RF signal received at the antennas 215 based on a PS factor. The PS factor may be a value between 0 and 1 (or may be a percentage value between 0 and 100 percent) that may indicate the portion of the received RF signal (including no portion or the entirety of the RF signal) that is to be used for EH at the UE 115-a. For example, an amount of energy harvested at a receiver from a source may be calculated based on Equation 1 below.

$$E_j = \eta \rho P_i |g_{i-j}|^2 T \qquad (1)$$

In Equation 1, E may be the amount of energy harvested at receiver j from source i, ρ may represent the PS factor, $P_i$ may be the transmit power by node i, $g_{(i-j)}$ may be the channel coefficient of the link between node i and node j, T may be the time allocated for EH, and η may be the RF-to-DC conversion efficiency.

In some examples, the UE 115-a may transmit PS capability signaling 235. The PS capability signaling 235 may indicate that the UE 115-a is capable of supporting PS for EH or signals received at the UE 115-a (e.g., a downlink transmission 240). For example, the UE 115-a may transmit the PS capability signaling 235 to the base station 105-a via any one of a variety of messages (e.g., control messages, data messages, or other messages). In some examples, the base station 105-a may increase a transmission power of the downlink transmission 240 (e.g., a downlink control information transmission, a data transmission, or other transmission) to provide more RF energy for EH via PS at the UE 115-a. Such an example may be carried out in a variety of scenarios (e.g., a random access procedure scenario, a connected state scenario with ongoing data transmissions, or other scenarios).

In some examples, the UE 115-a may signal the PS factor to the base station 105-a (e.g., the UE 115-a may transmit a PS factor indication 255 to the base station 105-a), and the base station 105-*a* may transmit an MCS indication 245 to the UE 115-*a*. The base station 105-*a* may take the PS factor into account when determining or selecting an MCS for use in one or more transmissions with the UE 115-*a*. The base station 105-*a* may transmit an MCS indication 245 to the UE 115-*a* in accordance with the determined or selected MCS. For example, if the UE 115-*a* is to perform EH, the UE 115-*a* may transmit a PS factor indication 255 based on the amount of RF energy that the UE 115-*a* will used for EH. In such an example, the UE 115-*a* using a portion of the RF energy for EH may be taken into account by the base station 105-*a* when the base station 105-*a* determines or selects MCS.

In some examples, the UE 115-*a* may signal the PS factor to another UE (e.g., UE 115-*b*). In some examples, the UE 115-*b* may be a sidelink UE that may communicate with the UE 115-*a* (or a base station 105-*a*, another base station, or another UE) and may communicate sidelink messages via one or more sidelink communication links 210 with UE 115-*a*. In some examples, UE 115-*b* may assist in charging the UE 115-*a* by sending one or more transmissions over sidelink communications link 210 to the UE 115-*a* that the UE 115-*a* may use for EH in accordance with techniques described herein. In some examples, multiple UEs 115 may transmit to each other to assist in EH procedures performed by one or more of the multiple UEs 115. In some examples, such a scheme may be part of a service provided by a base station 105-*a* to charge the multiple UEs 115.

In some examples, the base station 105-*a* may transmit an indication of a PS factor for the UE 115-*a* to use. In some examples, an indication of a PS factor may be transmitted in DCI 250. DCI 250 may be a DCI that carries other indications or information, or the DCI 250 may be a new format of a DCI dedicated for use for the PS factor indication. In some examples, PS factor may be determined or used in conjunction with an MCS, a rank indicator (RI), or both (optionally along with additional configurations or settings). For example, the base station 105-*a* may transmit an indication of a PS factor for the UE 115-*a* to use to reduce or avoid errors or mismatches that may occur at the UE 115-*a*. Such errors or mismatches may arise in situations where a power splitter 220 or PS factor that may harvest a larger amount of energy from the RF signal is used, because a data rate may be reduced because of such a power splitter 220 or PS factor. Therefore, the base station 105-*a* may indicate a suggested PS factor to modify an amount of energy used for EH to avoid reducing possible MCSs that may be used in the context of a block error rate (BLER) metric. Further, such an approach with a PS factor may allow for dynamic change of configuration for the UE 115-*a* or the power splitter 220 based on reliability or transport block size.

Figure 3:
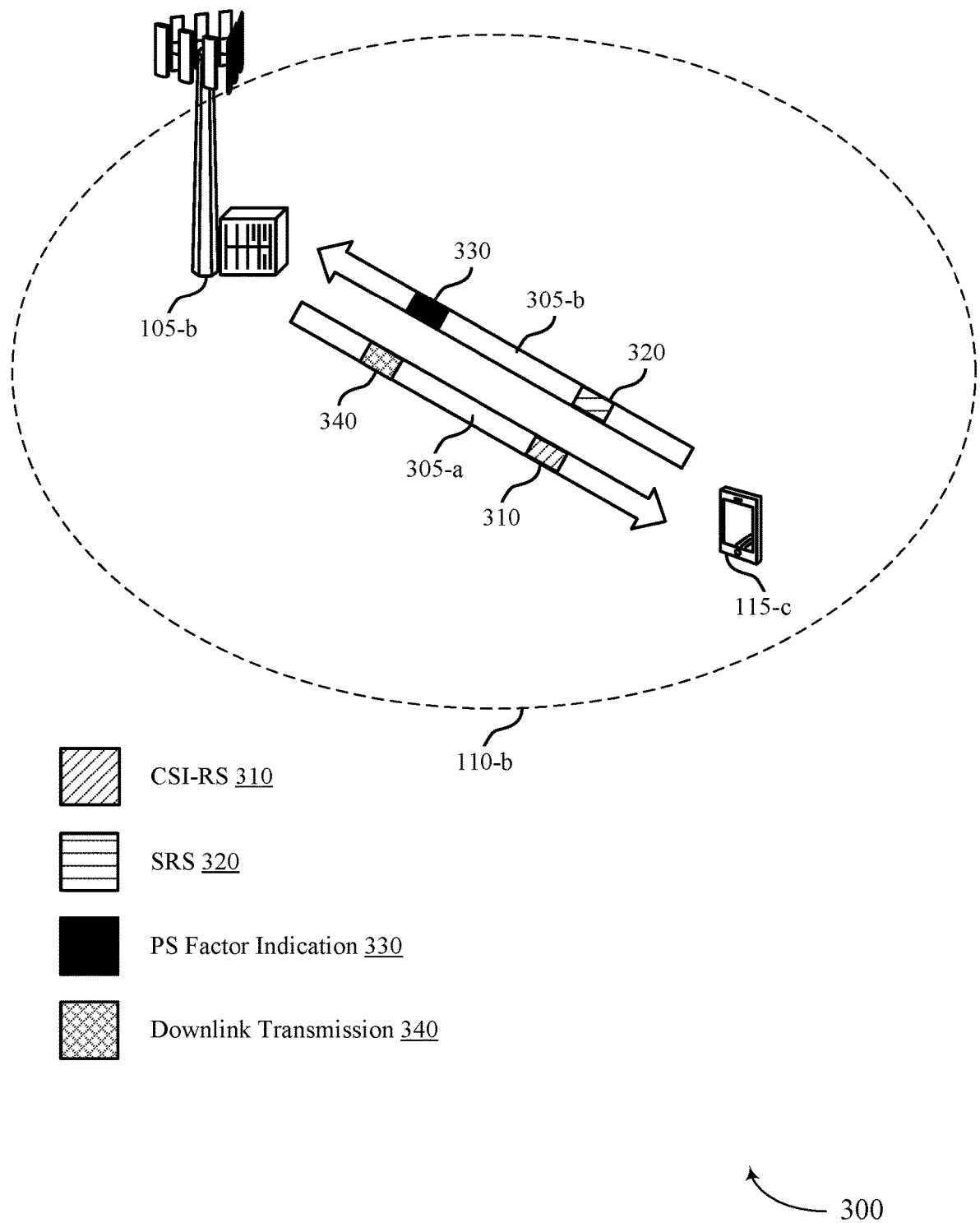
FIG. 3 illustrates an example of a wireless communications system that supports PS for EH wireless devices in accordance with aspects of the present disclosure.

FIG. 3 illustrates an example of a wireless communications system 300 that supports PS for EH wireless devices in accordance with aspects of the present disclosure. The wireless communications system 300 may include a base station 105-*b* and a UE 115-*c*, which may be examples of the corresponding devices described herein.

In some examples, the base station 105-*b* may support communications for a UE 115-*c* in a geographic coverage area 110-*b*. The base station 105-*b* may communicate with the UE 115-*c* via one or more downlink communication links 305-*a* and one or more uplink communication links 305-*b*.

In some examples, the base station 105-*b* may transmit a CSI-RS 310 to the UE 115-*c* so that the UE 115-*c* may perform channel estimation (e.g., the UE 115-*c* may compute a CSI-RS SINR) and prepare a channel quality report (e.g., a report including CQI, RI, L1-RSRP, other information, or a combination thereof). In such channel estimation and reporting, the UE 115-*c* may take a PS factor into account. For example, the UE 115-*c* may prepare a channel quality information (CQI) report to transmit to the base station 105-*b*. Even though, in some examples, the UE 115-*c* may not engage in EH or PS during sounding for reasons of accuracy in channel estimation and transmission parameter estimation, the UE 115-*c* may take a PS factor into account while preparing a report to be transmitted to the base station 105-*b*.

In some examples, the UE 115-*c* may engage in channel sounding, in which the UE 115-*c* may transmit a sounding reference signal (SRS) 320 to the base station 105-*b*. In some examples, the base station 105-*b* may receive the SRS 320 and perform channel estimation based on the received SRS 320. In some examples, the UE 115-*c* may transmit a PS factor indication 330 to the base station 105-*b*. The base station 105-*b* may use the SRS 320, channel characteristics derived from the channel estimation, the PS factor indication 330, or a combination thereof, to determine or select an MCS, an RI, or both, for use in communications between the base station 105-*b* and the UE 115-*c*. In the course of such determinations or selections, the base station 105-*b* takes the PS factor into account so that the MCS, the RI, or both, may be determined or selected appropriately to avoid errors, mismatches, or other problems that may result from not taking the PS factor into account. Additionally, or alternatively, the base station 105-*b* may transmit an MCS indication (e.g., the MCS indication 245 as described in relation to FIG. 2) to the UE 115-*c* that the UE 115-*c* may use in the course of communications with the base station 105-*b*.

Figure 4:
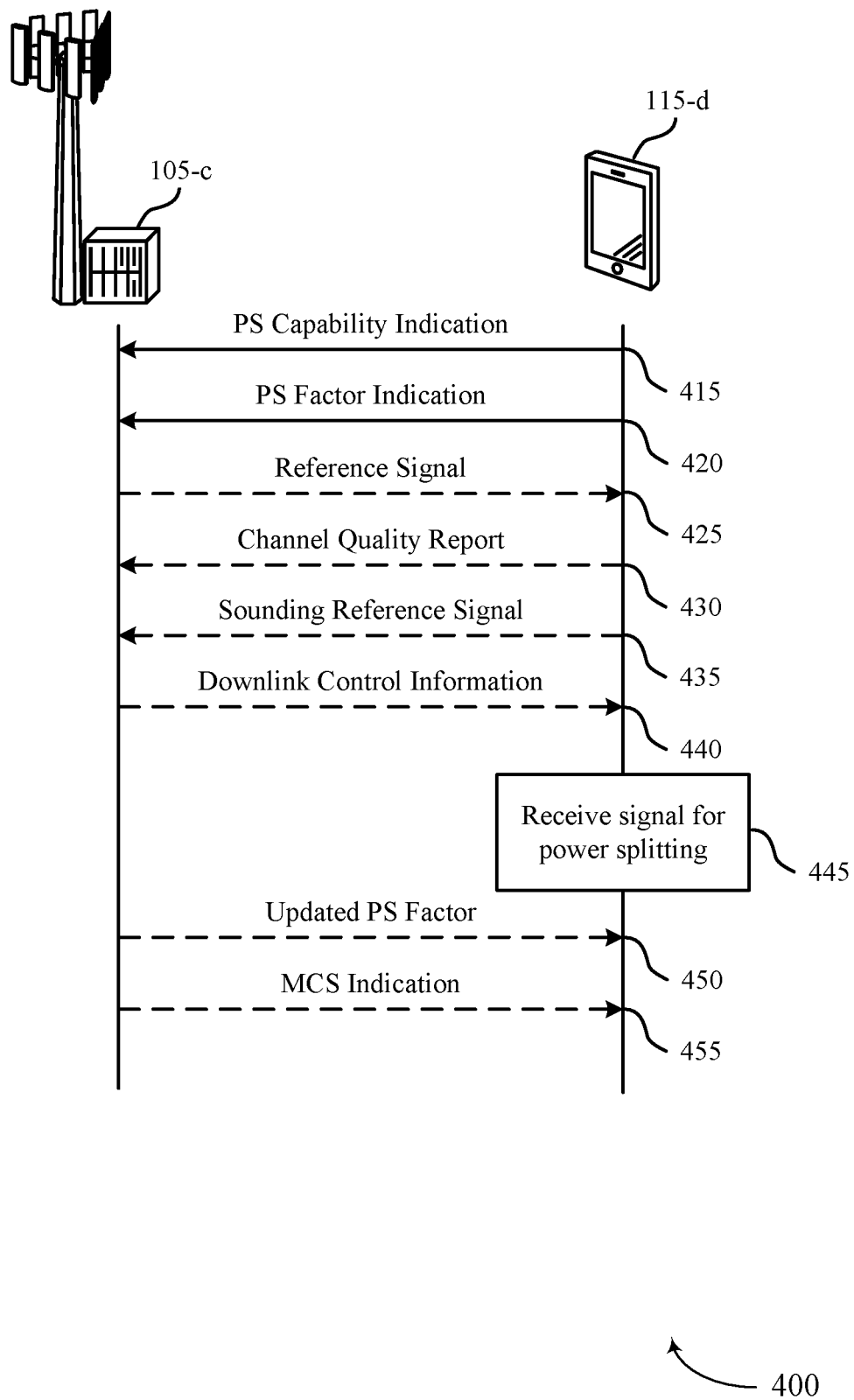
FIG. 4 illustrates an example of a process flow that supports PS for EH wireless devices in accordance with aspects of the present disclosure.

FIG. 4 illustrates an example of a process flow 400 that supports PS for EH wireless devices in accordance with aspects of the present disclosure. The process flow 400 may implement various aspects of the present disclosure described with reference to FIGS. 1-3. The process flow 400 may include a base station 105-*c* and a UE 115-*d*, which may be examples of the corresponding devices described herein. In some examples, the UE 115-*d* may be configured with a PS capability for EH of RF signals received by the UE 115-*d*.

In the following description of the process flow 400, the operations between the base station 105-*c* and the UE 115-*d* may be performed in different orders or at different times. Some operations may also be left out of the process flow 400, or other operations may be added. Although the base station 105-*c* and the UE 115-*d* are shown performing the operations of the process flow 400, some aspects of some operations may also be performed by one or more other wireless devices.

At 415, the UE 115-*d* may transmit a message (e.g., PS capability signaling 235 as discussed in relation to FIG. 2) that may indicate a capability of the UE 115-*d* to support PS for signals received at the UE 115-*d* for EH by the UE 115-*d*. In some examples, transmitting the message may include transmitting the message to the base station 105-*c* in communication with the UE 115-*d*. In some examples, transmitting the message may include transmitting the message to a second UE in sidelink communication with the UE 115-*d*.

At 420, the UE 115-*d* may transmit, based on the capability of the UE 115-*d* to support PS for signals received at the UE 115-*d* for EH by the UE 115-*d*, an indication of a PS factor (e.g., the PS factor indication 255 discussed in relation to FIG. 2 or the PS factor indication 330 discussed in relation to FIG. 3) for EH by the UE 115-*d*. The PS factor may indicate a portion of received power for signals received at the UE 115-*d* to be used for EH. In some examples, the UE 115-*d* may receive a request for the PS factor from the second UE, wherein the indication of the PS factor may be transmitted in response to the request. In some examples, the UE 115-*d* may transmit the indication of the PS factor to a base station 105-*c*. In some examples, the PS factor may be based on a reliability associated with a channel used for receiving the signal, a transport block size of the signal, or both.

At 425, the UE 115-*d* may receive, from a base station 105-*c*, a reference signal (e.g., the CSI-RS 310 discussed in relation to FIG. 3) for performing channel quality measurements at the UE 115-*d*.

At 430, the UE 115-*d* may transmit, to the base station 105-*c*, a channel quality report that may indicate one or more channel quality measurements performed at the UE 115-*d* based on the PS factor.

At 435, the UE 115-*d* may refrain from using the PS factor for transmission of a sounding reference signal (e.g., the SRS 320 discussed in relation to FIG. 3) to the base station 105-*c*.

At 440, the UE 115-*d* may receive a DCI message (e.g., the DCI 250 discussed in relation to FIG. 2) that indicates an updated PS factor, the modulation and coding scheme, or both.

At 445, the UE 115-*d* may receive a signal (e.g., the downlink transmission 240 discussed in relation to FIG. 2 or the downlink transmission 340 discussed in relation to FIG. 3) to use for PS based on the capability of the UE 115-*d* to support PS for signals received at the UE 115-*d* for EH by the UE 115-*d* and the PS factor. In some examples, receiving the signal to use for PS may include receiving the signal from a base station 105-*c* or a second UE in sidelink communication with the UE 115-*d*, wherein a transmit power of the signal may be based on the PS factor. In some examples, receiving the signal to use for PS may include receiving the signal from the base station 105-*c*, wherein a modulation and coding scheme of the signal may be based on the PS factor.

At 450, the UE 115-*d* may receive from the base station 105-*c*, an updated PS factor based on transmitting the indication of the PS factor to the base station 105-*c*.

At 455, the UE 115-*d* may receive, from the base station 105-*c*, a modulation and coding scheme (e.g., the MCS indication 245) for receiving the signal based on the updated PS factor, wherein the signal may be received based on the modulation and coding scheme and the updated PS factor.

Figure 5:
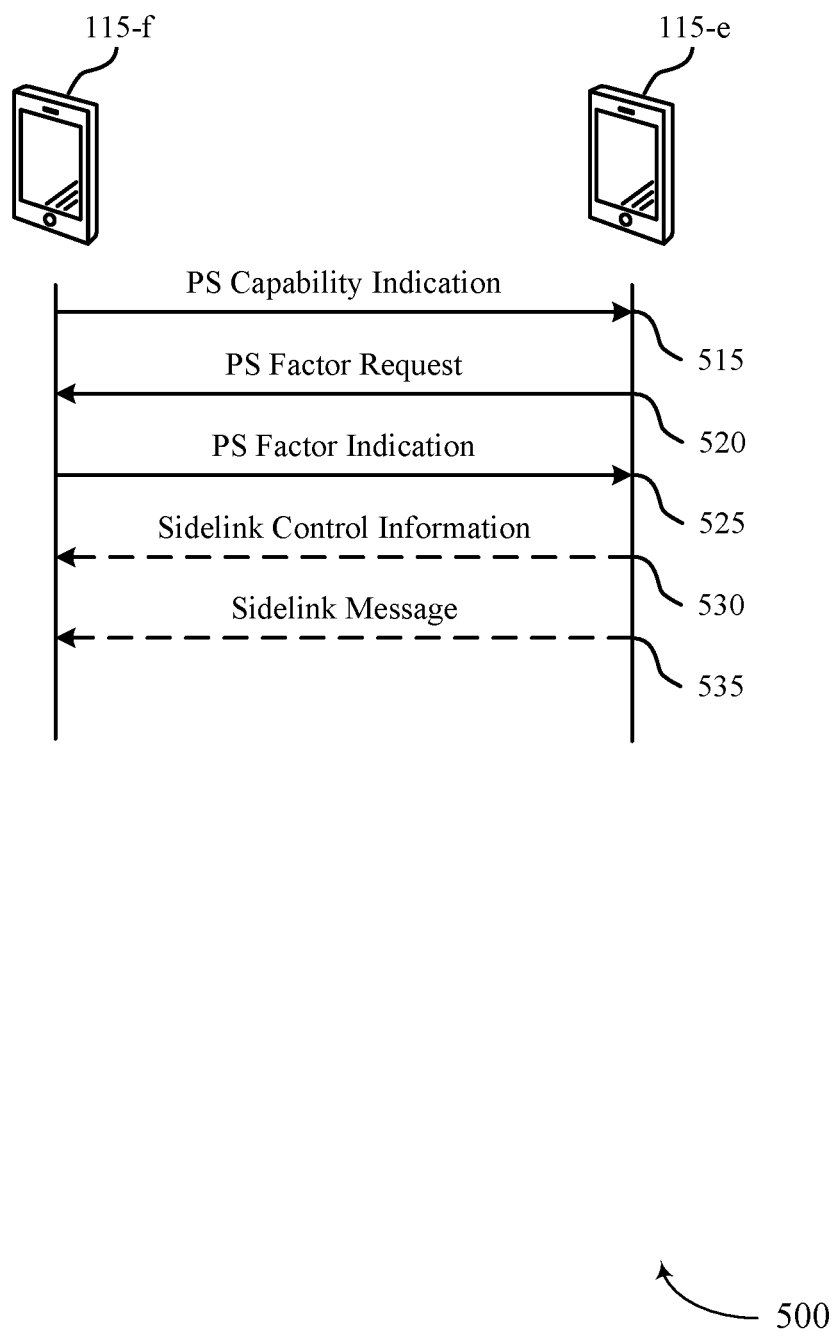
FIG. 5 illustrates an example of a process flow that supports PS for EH wireless devices in accordance with aspects of the present disclosure.

FIG. 5 illustrates an example of a process flow 500 that supports PS for EH wireless devices in accordance with aspects of the present disclosure. The process flow 500 may implement various aspects of the present disclosure described with reference to FIGS. 1-4. The process flow 500 may include a UE 115-*e* and a UE 115-*f*, which may be examples of the corresponding devices described herein. In some examples, the UE 115-*f* may be configured with a PS capability for EH of RF signals received by the UE 115-*e*.

In the following description of the process flow 500, the operations between the UE 115-*e* and the UE 115-*f* may be performed in different orders or at different times. Some operations may also be left out of the process flow 500, or other operations may be added. Although the first UE 115-*e* and the second UE 115-*f* are shown performing the operations of the process flow 500, some aspects of some operations may also be performed by one or more other wireless devices.

At 515, the first UE 115-*e* may receive a message from the second UE 115-*f*, and the message may indicate a capability of the second UE 115-*f* to support PS for signals received at the second UE 115-*f* for EH by the second UE 115-*f*.

At 520, the first UE 115-*e* may transmit a request for a PS factor from the second UE 115-*f* based at least in part on the capability of the second UE 115-*f* to support PS for signals received at the second UE 115-*f* for EH by the second UE 115-*f*.

At 525, the first UE 115-*e* may receive, in response to the request, an indication of the PS factor for EH by the second UE 115-*f*, the PS factor indicating a portion of received power for signals received at the second UE 115-*f* to be used for EH.

At 530, the first UE 115-*e* may transmit a sidelink control message to schedule a sidelink message, wherein the sidelink control message may include a PC5 control message.

At 535, the first UE 115-*e* may transmit a sidelink message to the second UE 115-*f*. In some examples, the first UE 115-*e* may transmit the sidelink message using a transmit power that is based at least in part on the PS factor. In some examples, the first UE 115-*e* may transmit the sidelink message to the second UE using a MCS that is based on the PS factor, and the UE 115-*f* may use the sidelink message 535 for EH.

Figure 6:
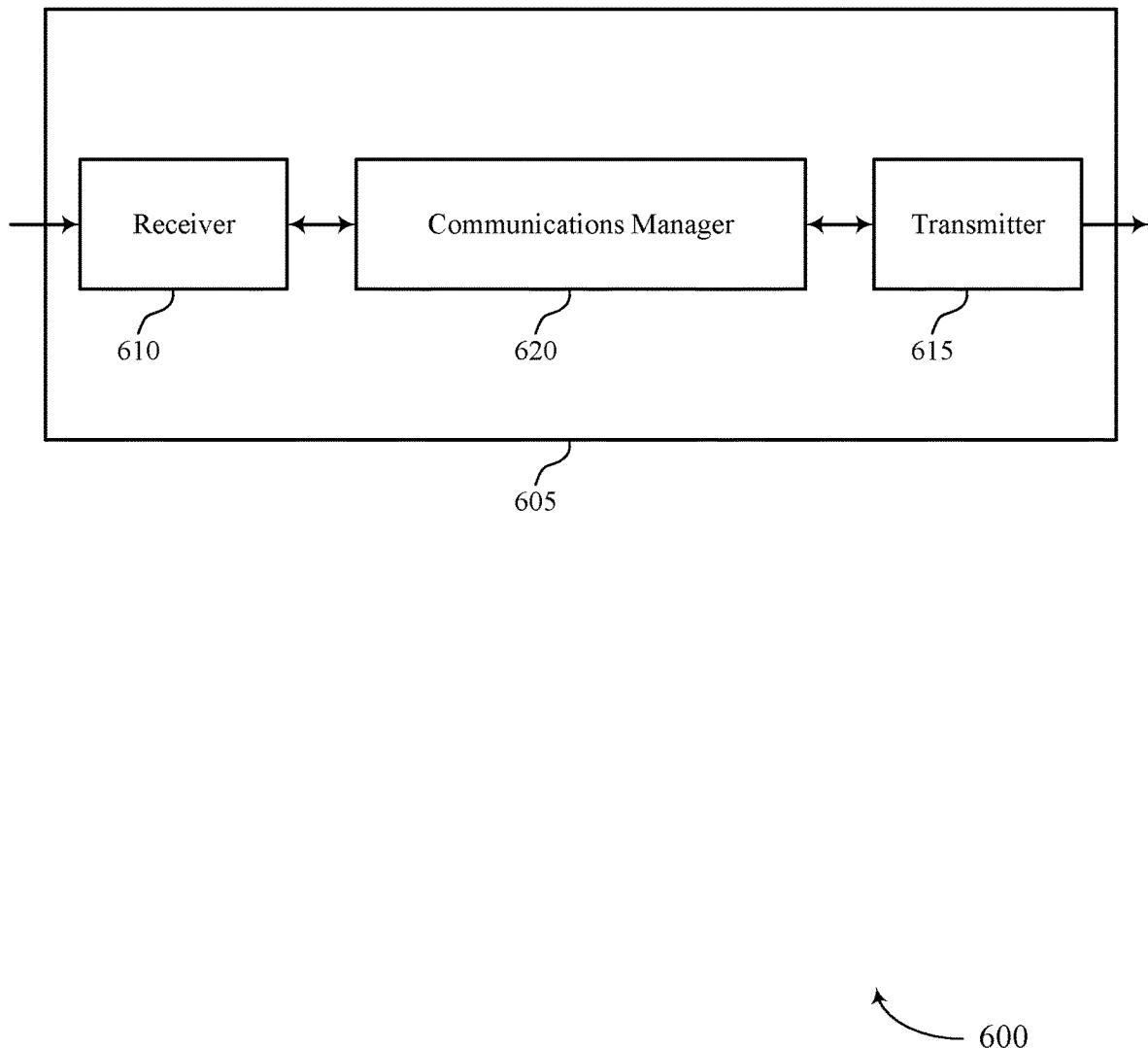
FIGS. 6 and 7 show block diagrams of devices that support PS for EH wireless devices in accordance with aspects of the present disclosure.

FIG. 6 shows a block diagram 600 of a device 605 that supports PS for EH wireless devices in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to PS for EH wireless devices). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to PS for EH wireless devices). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of PS for EH wireless devices as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for transmitting a message indicating a capability of the UE to support PS for signals received at the UE for EH by the UE. The communications manager 620 may be configured as or otherwise support a means for transmitting, based on the capability of the UE to support PS for signals received at the UE for EH by the UE, an indication of a PS factor for EH by the UE, the PS factor indicating a portion of received power for signals received at the UE to be used for EH. The communications manager 620 may be configured as or otherwise support a means for receiving a signal to use for PS based on the capability of the UE to support PS for signals received at the UE for EH by the UE and the PS factor.

Additionally or alternatively, the communications manager 620 may support wireless communications at a first UE in accordance with examples as disclosed herein. For example, the communications manager 620 may be configured as or otherwise support a means for receiving a message from a second UE, the message indicating a capability of the second UE to support PS for signals received at the second UE for EH by the second UE. The communications manager 620 may be configured as or otherwise support a means for transmitting a request for a PS factor from the second UE based on the capability of the second UE to support PS for signals received at the second UE for EH by the second UE. The communications manager 620 may be configured as or otherwise support a means for transmitting, in response to the request, an indication of the PS factor for EH by the second UE, the PS factor indicating a portion of received power for signals received at the second UE to be used for EH.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for increased battery life and EH storage efficiency, and more efficient utilization of communication resources.

Figure 7:
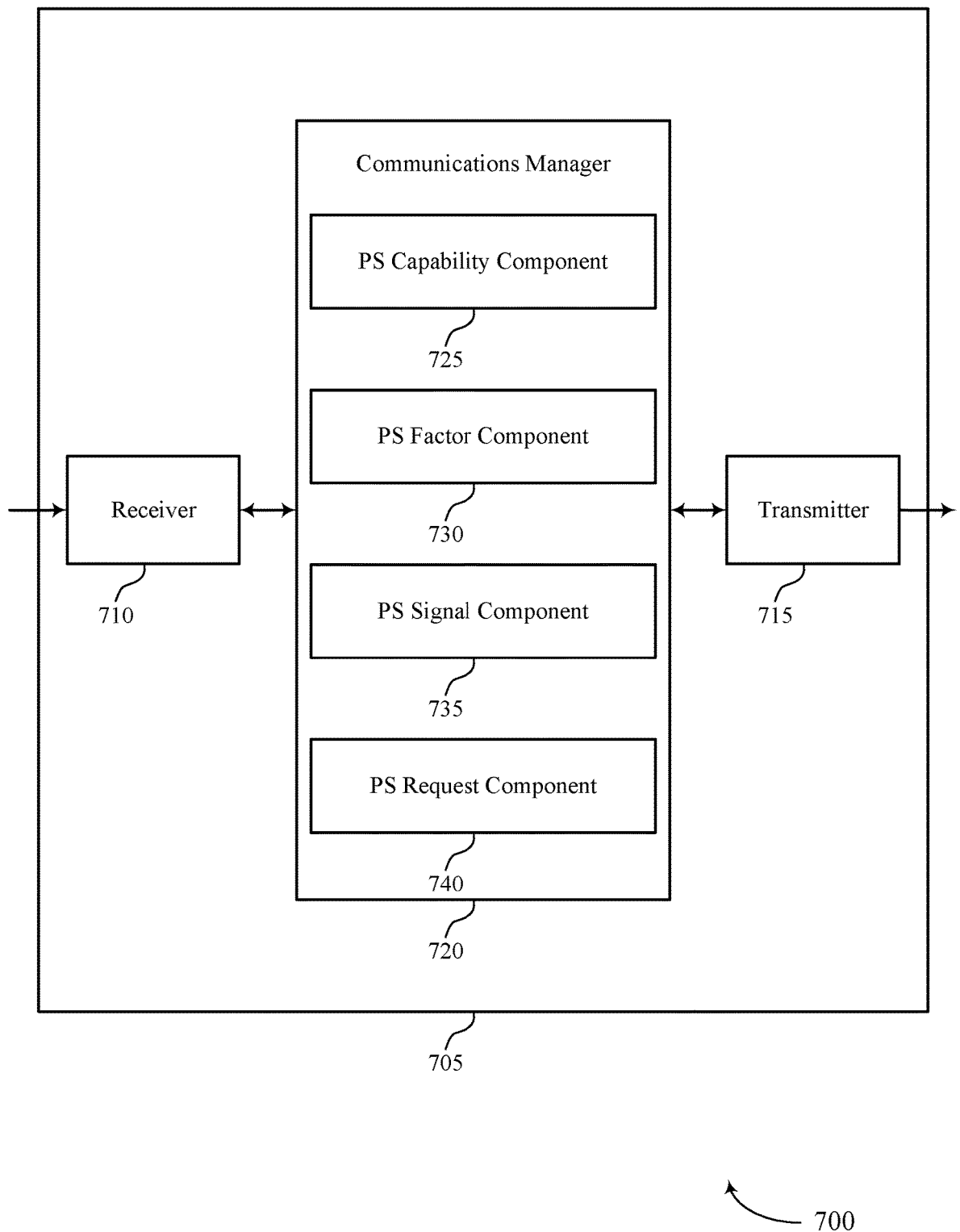

FIG. 7 shows a block diagram 700 of a device 705 that supports PS for EH wireless devices in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to PS for EH wireless devices). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to PS for EH wireless devices). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of PS for EH wireless devices as described herein. For example, the communications manager 720 may include a PS capability component 725, a PS factor component 730, a PS signal component 735, a PS request component 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The PS capability component 725 may be configured as or otherwise support a means for transmitting a message indicating a capability of the UE to support PS for signals received at the UE for EH by the UE. The PS factor component 730 may be configured as or otherwise support a means for transmitting, based on the capability of the UE to support PS for signals received at the UE for EH by the UE, an indication of a PS factor for EH by the UE, the PS factor indicating a portion of received power for signals received at the UE to be used for EH. The PS signal component 735 may be configured as or otherwise support a means for receiving a signal to use for PS based on the capability of the UE to support PS for signals received at the UE for EH by the UE and the PS factor.

Additionally or alternatively, the communications manager 720 may support wireless communications at a first UE in accordance with examples as disclosed herein. The PS capability component 725 may be configured as or otherwise support a means for receiving a message from a second UE, the message indicating a capability of the second UE to support PS for signals received at the second UE for EH by the second UE. The PS request component 740 may be configured as or otherwise support a means for transmitting a request for a PS factor from the second UE based on the capability of the second UE to support PS for signals received at the second UE for EH by the second UE. The PS factor component 730 may be configured as or otherwise support a means for transmitting, in response to the request, an indication of the PS factor for EH by the second UE, the PS factor indicating a portion of received power for signals received at the second UE to be used for EH.

Figure 8:
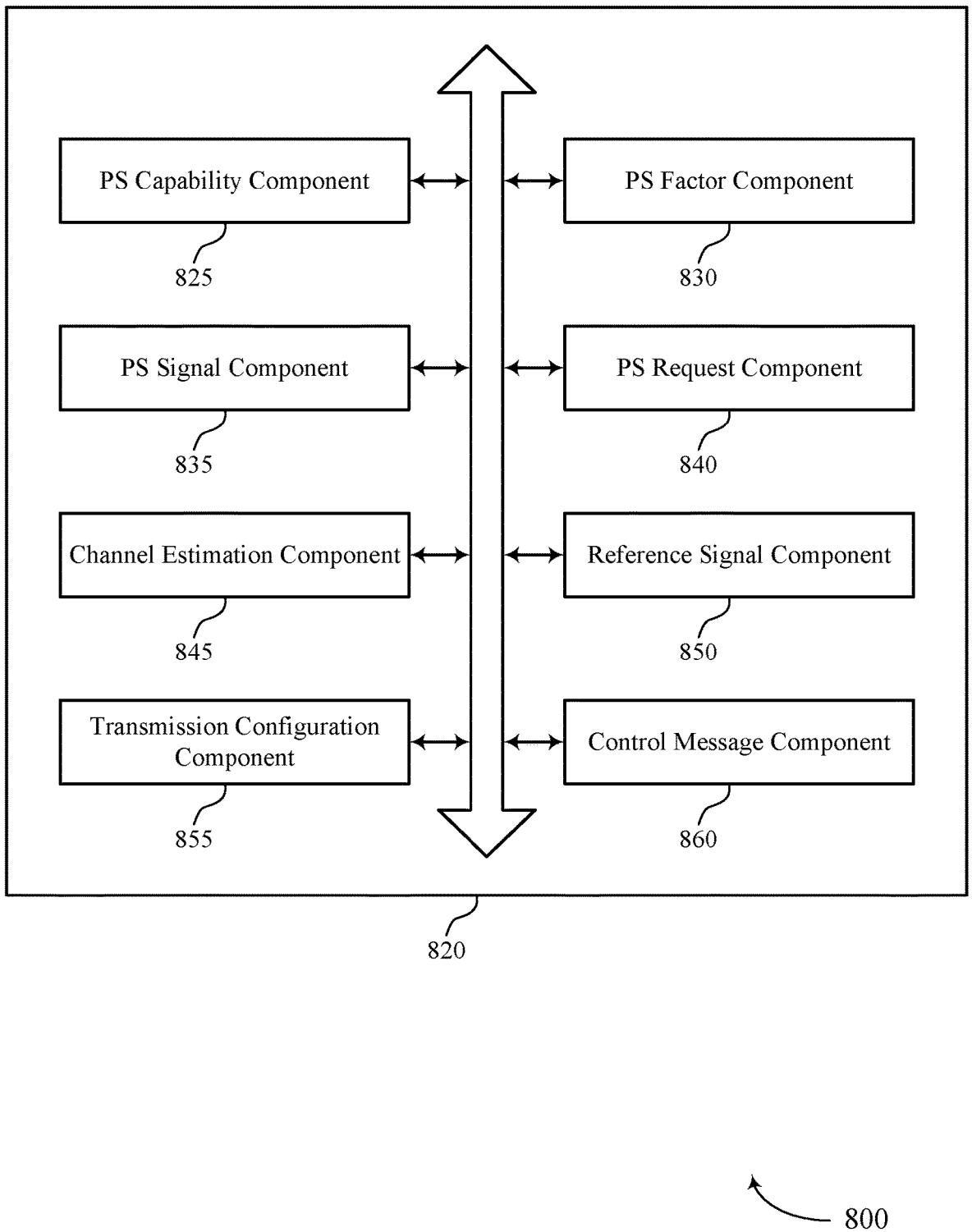
FIG. 8 shows a block diagram of a communications manager that supports PS for EH wireless devices in accordance with aspects of the present disclosure.

FIG. 8 shows a block diagram 800 of a communications manager 820 that supports PS for EH wireless devices in accordance with aspects of the present disclosure. The communications manager 820 may be an example of aspects of a communications manager 620, a communications manager 720, or both, as described herein. The communications manager 820, or various components thereof, may be an example of means for performing various aspects of PS for EH wireless devices as described herein. For example, the communications manager 820 may include a PS capability component 825, a PS factor component 830, a PS signal component 835, a PS request component 840, a channel estimation component 845, a reference signal component 850, a transmission configuration component 855, a control message component 860, or any combination thereof. Each of these components may communicate, directly or indirectly, with one another (e.g., via one or more buses).

The communications manager 820 may support wireless communications at a UE in accordance with examples as disclosed herein. The PS capability component 825 may be configured as or otherwise support a means for transmitting a message indicating a capability of the UE to support PS for signals received at the UE for EH by the UE. The PS factor component 830 may be configured as or otherwise support a means for transmitting, based on the capability of the UE to support PS for signals received at the UE for EH by the UE, an indication of a PS factor for EH by the UE, the PS factor indicating a portion of received power for signals received at the UE to be used for EH. The PS signal component 835 may be configured as or otherwise support a means for receiving a signal to use for PS based on the capability of the UE to support PS for signals received at the UE for EH by the UE and the PS factor.

In some examples, to support receiving the signal to use for PS, the PS signal component 835 may be configured as or otherwise support a means for receiving the signal from a base station or a second UE in sidelink communication with the UE, where a transmit power of the signal is based on the PS factor.

In some examples, to support transmitting the message, the PS capability component 825 may be configured as or otherwise support a means for transmitting the message to a base station in communication with the UE.

In some examples, to support receiving the signal to use for PS, the PS signal component 835 may be configured as or otherwise support a means for receiving the signal from the base station, where a modulation and coding scheme of the signal is based on the PS factor.

In some examples, to support transmitting the message, the PS capability component 825 may be configured as or otherwise support a means for transmitting the message to a second UE in sidelink communication with the UE.

In some examples, the PS request component 840 may be configured as or otherwise support a means for receiving a request for the PS factor from the second UE, where the indication of the PS factor is transmitted in response to the request.

In some examples, the PS factor component 830 may be configured as or otherwise support a means for transmitting the indication of the PS factor to a base station. In some examples, the channel estimation component 845 may be configured as or otherwise support a means for refraining from using the PS factor for transmission of a sounding reference signal to the base station.

In some examples, the reference signal component 850 may be configured as or otherwise support a means for receiving, from a base station, a reference signal for performing channel quality measurements at the UE. In some examples, the channel estimation component 845 may be configured as or otherwise support a means for transmitting, to the base station, a channel quality report indicating one or more channel quality measurements performed at the UE based on the PS factor.

In some examples, the PS factor component 830 may be configured as or otherwise support a means for receiving, from a base station, an updated PS factor based on transmitting the indication of the PS factor to the base station. In some examples, the transmission configuration component 855 may be configured as or otherwise support a means for receiving, from the base station, a modulation and coding scheme for receiving the signal based on the updated PS factor, where the signal is received based on the modulation and coding scheme and the updated PS factor.

In some examples, the transmission configuration component 855 may be configured as or otherwise support a means for receiving a DCI message that indicates the updated PS factor, the modulation and coding scheme, or both.

In some examples, the PS factor is based on a reliability associated with a channel used for receiving the signal, a transport block size of the signal, or both.

Additionally or alternatively, the communications manager 820 may support wireless communications at a first UE in accordance with examples as disclosed herein. In some examples, the PS capability component 825 may be configured as or otherwise support a means for receiving a message from a second UE, the message indicating a capability of the second UE to support PS for signals received at the second UE for EH by the second UE. The PS request component 840 may be configured as or otherwise support a means for transmitting a request for a PS factor from the second UE based on the capability of the second UE to support PS for signals received at the second UE for EH by the second UE. In some examples, the PS factor component 830 may be configured as or otherwise support a means for transmitting, in response to the request, an indication of the PS factor for EH by the second UE, the PS factor indicating a portion of received power for signals received at the second UE to be used for EH.

In some examples, the PS signal component 835 may be configured as or otherwise support a means for transmitting a sidelink message to the second UE using a transmit power that is based on the PS factor.

In some examples, the PS signal component 835 may be configured as or otherwise support a means for transmitting a sidelink message to the second UE using a modulation and coding scheme that is based on the PS factor.

In some examples, the control message component 860 may be configured as or otherwise support a means for receiving a sidelink control message that includes the indication of the PS factor, where the sidelink control message includes a PC5 control message.

Figure 9:
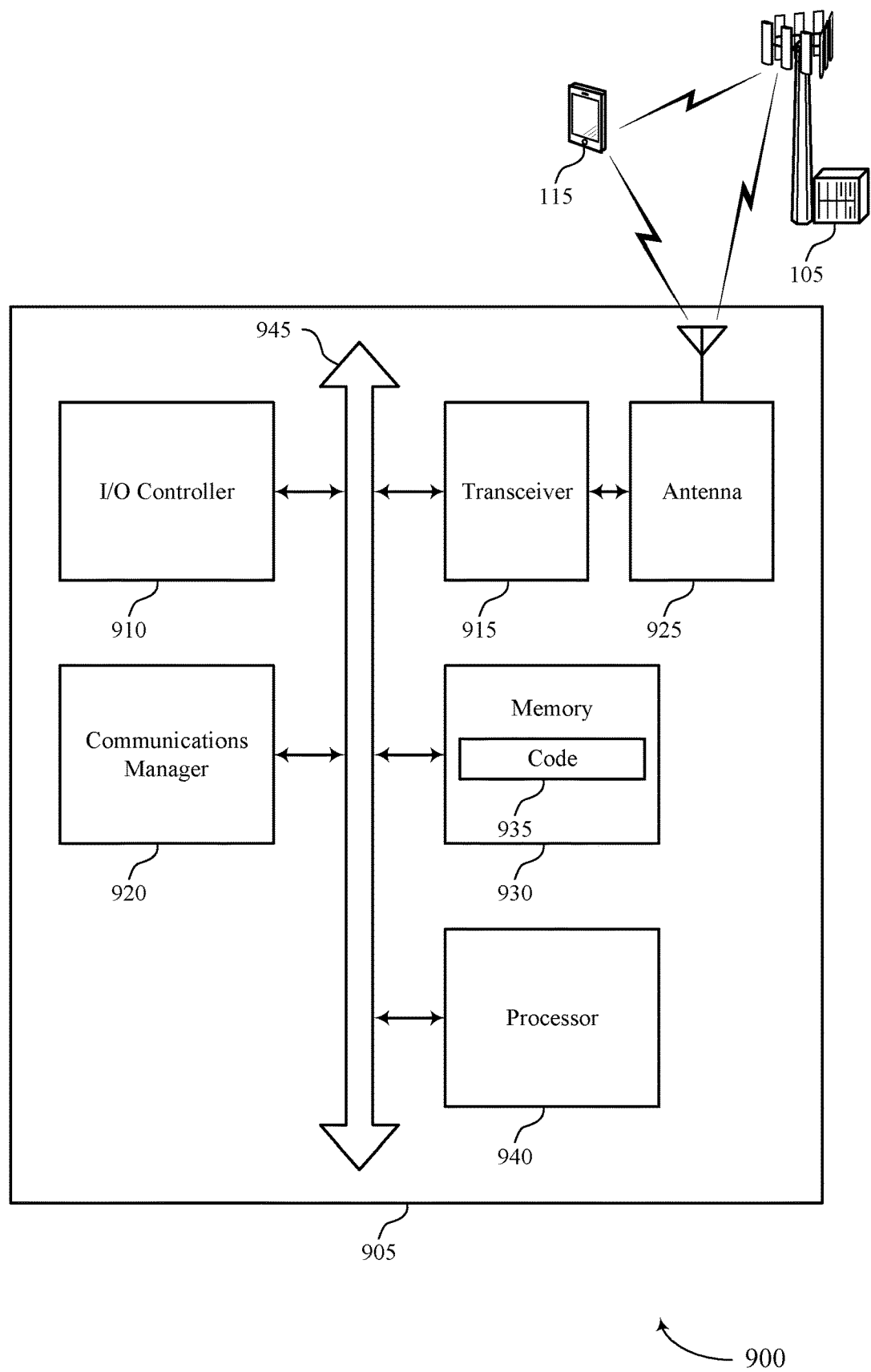
FIG. 9 shows a diagram of a system including a device that supports PS for EH wireless devices in accordance with aspects of the present disclosure.

FIG. 9 shows a diagram of a system 900 including a device 905 that supports PS for EH wireless devices in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting PS for EH wireless devices). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for transmitting a message indicating a capability of the UE to support PS for signals received at the UE for EH by the UE. The communications manager 920 may be configured as or otherwise support a means for transmitting, based on the capability of the UE to support PS for signals received at the UE for EH by the UE, an indication of a PS factor for EH by the UE, the PS factor indicating a portion of received power for signals received at the UE to be used for EH. The communications manager 920 may be configured as or otherwise support a means for receiving a signal to use for PS based on the capability of the UE to support PS for signals received at the UE for EH by the UE and the PS factor.

Additionally or alternatively, the communications manager 920 may support wireless communications at a first UE in accordance with examples as disclosed herein. For example, the communications manager 920 may be configured as or otherwise support a means for receiving a message from a second UE, the message indicating a capability of the second UE to support PS for signals received at the second UE for EH by the second UE. The communications manager 920 may be configured as or otherwise support a means for transmitting a request for a PS factor from the second UE based on the capability of the second UE to support PS for signals received at the second UE for EH by the second UE. The communications manager 920 may be configured as or otherwise support a means for transmitting, in response to the request, an indication of the PS factor for EH by the second UE, the PS factor indicating a portion of received power for signals received at the second UE to be used for EH.

By including or configuring the communications manager 920 in accordance with examples as described herein, the device 905 may support techniques for improved user experience related to longer battery life, increased EH capabilities and techniques, more efficient utilization of communication resources, and improved coordination between devices.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of PS for EH wireless devices as described herein, or the processor 940 and the memory 930 may be otherwise configured to perform or support such operations.

Figure 10:
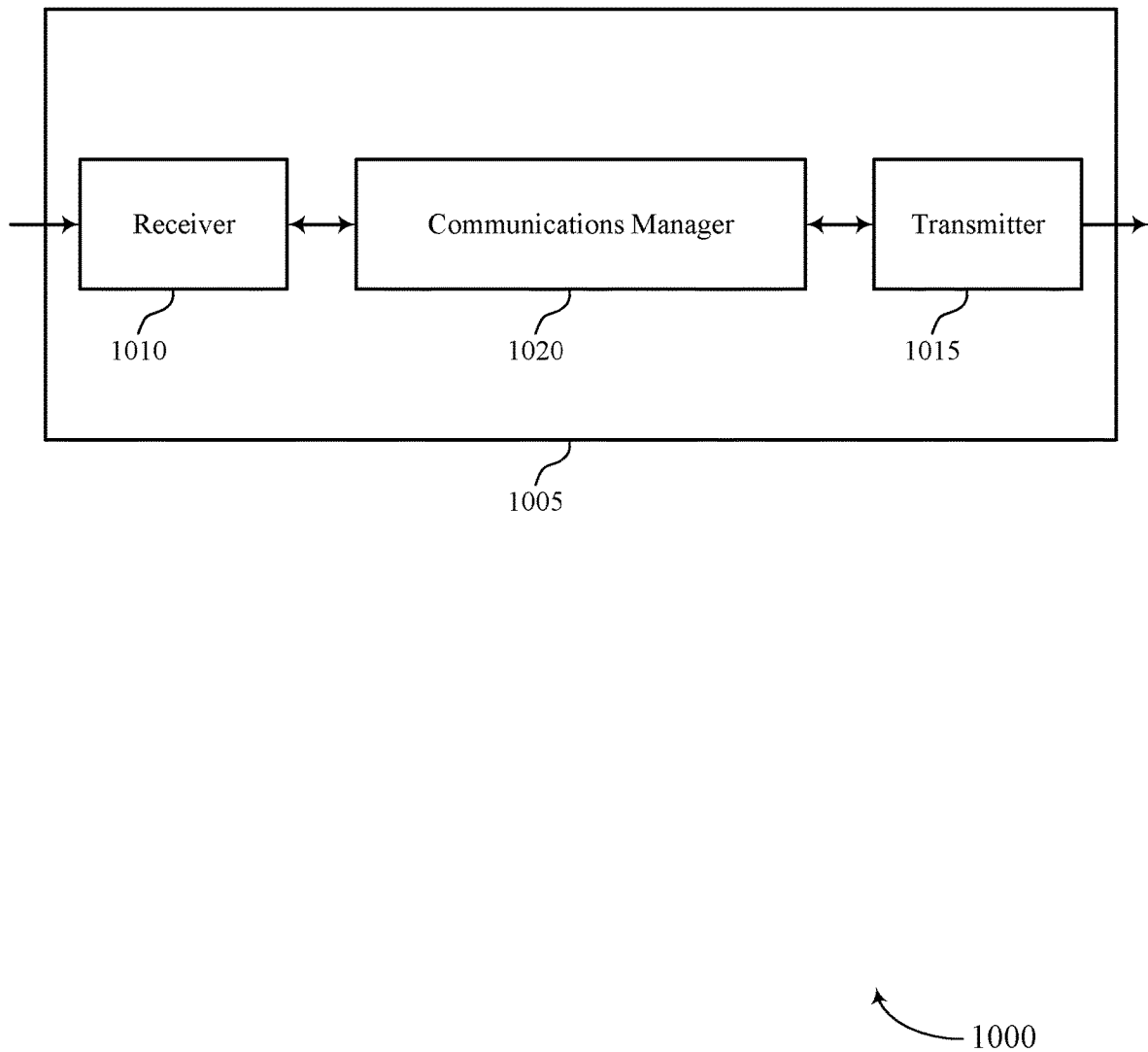
FIGS. 10 and 11 show block diagrams of devices that support PS for EH wireless devices in accordance with aspects of the present disclosure.

FIG. 10 shows a block diagram 1000 of a device 1005 that supports PS for EH wireless devices in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to PS for EH wireless devices). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to PS for EH wireless devices). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of PS for EH wireless devices as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. For example, the communications manager 1020 may be configured as or otherwise support a means for receiving a message from a UE, the message indicating a capability of the UE to support PS for signals received at the UE for EH by the UE. The communications manager 1020 may be configured as or otherwise support a means for receiving, based on the capability of the UE to support PS for signals received at the UE for EH by the UE, an indication of a PS factor for EH by the UE, the PS factor indicating a portion of received power for signals received at the UE to be used for EH. The communications manager 1020 may be configured as or otherwise support a means for transmitting a signal to the UE based on the capability of the UE to support PS for signals received at the UE for EH by the UE and the PS factor.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for reduced processing, reduced power consumption, more efficient utilization of communication resources.

Figure 11:
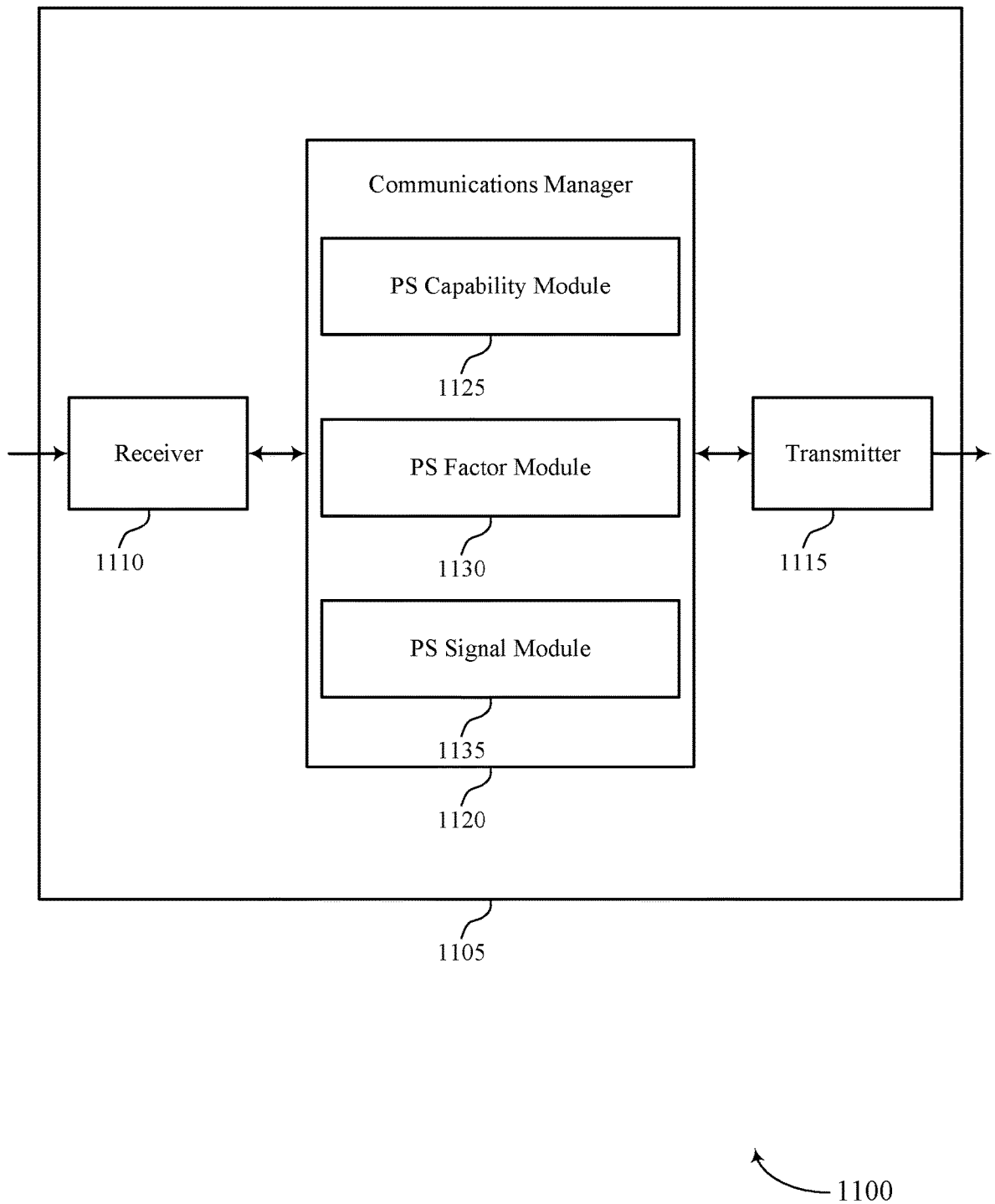

FIG. 11 shows a block diagram 1100 of a device 1105 that supports PS for EH wireless devices in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to PS for EH wireless devices). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to PS for EH wireless devices). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of PS for EH wireless devices as described herein. For example, the communications manager 1120 may include a PS capability module 1125, a PS factor module 1130, a PS signal module 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. The PS capability module 1125 may be configured as or otherwise support a means for receiving a message from a UE, the message indicating a capability of the UE to support PS for signals received at the UE for EH by the UE. The PS factor module 1130 may be configured as or otherwise support a means for receiving, based on the capability of the UE to support PS for signals received at the UE for EH by the UE, an indication of a PS factor for EH by the UE, the PS factor indicating a portion of received power for signals received at the UE to be used for EH. The PS signal module 1135 may be configured as or otherwise support a means for transmitting a signal to the UE based on the capability of the UE to support PS for signals received at the UE for EH by the UE and the PS factor.

Figure 12:
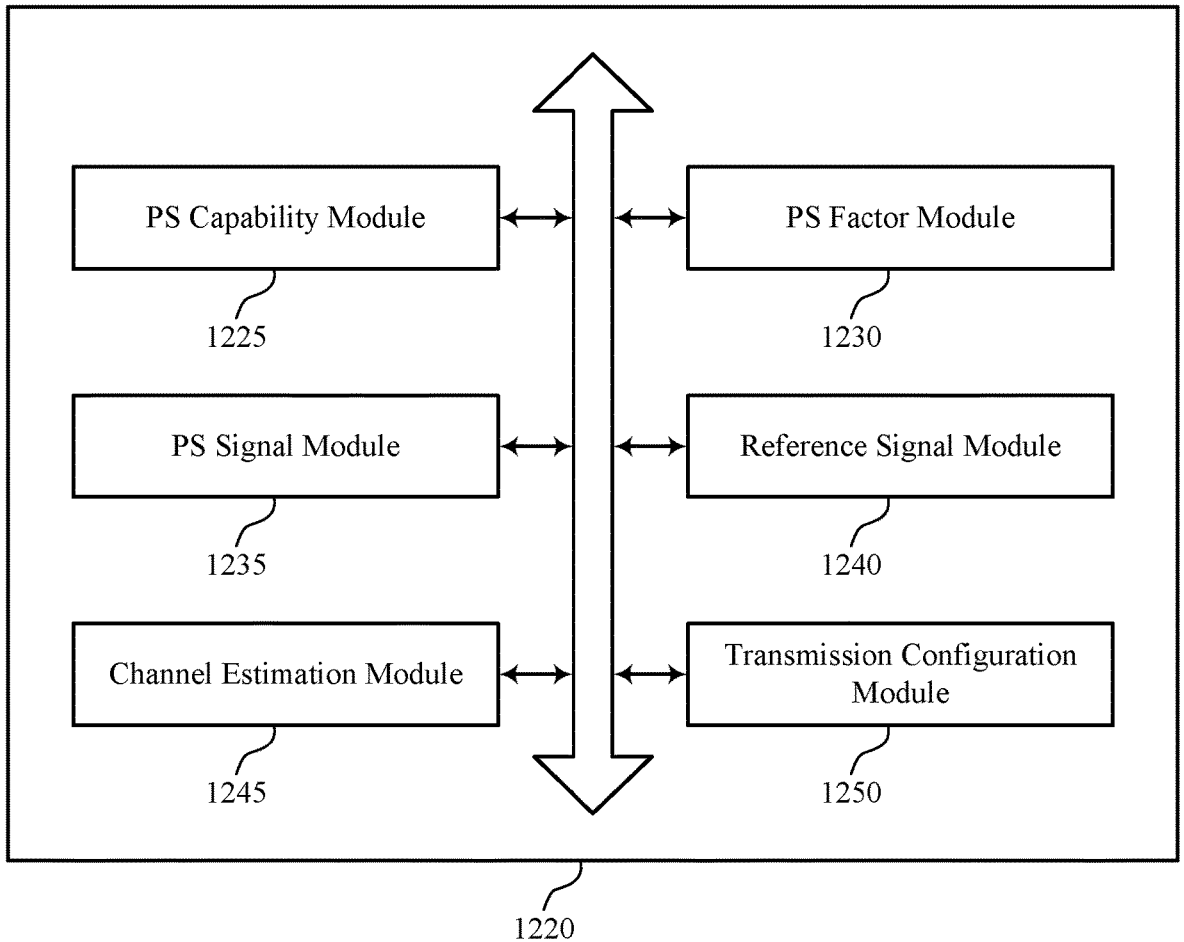
FIG. 12 shows a block diagram of a communications manager that supports PS for EH wireless devices in accordance with aspects of the present disclosure.

FIG. 12 shows a block diagram 1200 of a communications manager 1220 that supports PS for EH wireless devices in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of PS for EH wireless devices as described herein. For example, the communications manager 1220 may include a PS capability module 1225, a PS factor module 1230, a PS signal module 1235, a reference signal module 1240, a channel estimation module 1245, a transmission configuration module 1250, or any combination thereof. Each of these components may communicate, directly or indirectly, with one another (e.g., via one or more buses).

The communications manager 1220 may support wireless communications at a base station in accordance with examples as disclosed herein. The PS capability module 1225 may be configured as or otherwise support a means for receiving a message from a UE, the message indicating a capability of the UE to support PS for signals received at the UE for EH by the UE. The PS factor module 1230 may be configured as or otherwise support a means for receiving, based on the capability of the UE to support PS for signals received at the UE for EH by the UE, an indication of a PS factor for EH by the UE, the PS factor indicating a portion of received power for signals received at the UE to be used for EH. The PS signal module 1235 may be configured as or otherwise support a means for transmitting a signal to the UE based on the capability of the UE to support PS for signals received at the UE for EH by the UE and the PS factor.

In some examples, to support transmitting the signal, the PS signal module 1235 may be configured as or otherwise support a means for transmitting the signal using a transmit power that is based on the PS factor, a modulation and coding scheme that is based on the PS factor, a rank indicator that is based on the PS factor, or any combination thereof.

In some examples, the reference signal module 1240 may be configured as or otherwise support a means for transmitting, to the UE, a reference signal for performing channel quality measurements at the UE. In some examples, the channel estimation module 1245 may be configured as or otherwise support a means for receiving, from the UE, a channel quality report indicating one or more channel quality measurements performed at the UE based on the PS factor.

In some examples, the channel estimation module 1245 may be configured as or otherwise support a means for receiving a sounding reference signal from the UE. In some examples, the channel estimation module 1245 may be configured as or otherwise support a means for estimating the channel for communication with the UE based on the sounding reference signal and the PS factor.

In some examples, the PS factor module 1230 may be configured as or otherwise support a means for transmitting, to the UE, an updated PS factor based on the indication of the PS factor. In some examples, the transmission configuration module 1250 may be configured as or otherwise support a means for transmitting, to the UE, a modulation and coding scheme for receiving the signal based on the updated PS factor, where the signal is transmitting based on the modulation and coding scheme and the updated PS factor.

In some examples, the transmission configuration module 1250 may be configured as or otherwise support a means for transmitting a DCI message that indicates the updated PS factor, the modulation and coding scheme, or both.

Figure 13:
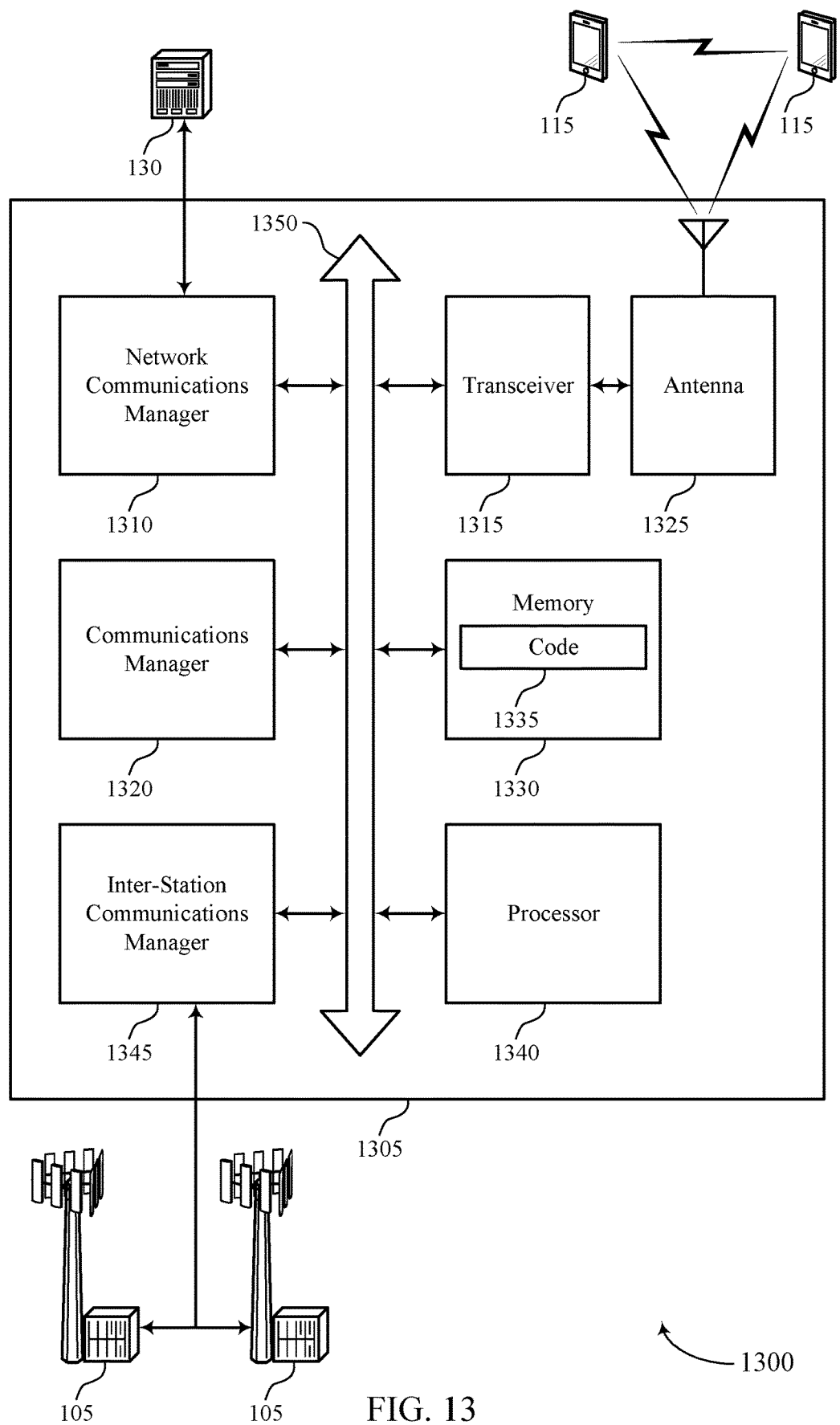
FIG. 13 shows a diagram of a system including a device that supports PS for EH wireless devices in accordance with aspects of the present disclosure.

FIG. 13 shows a diagram of a system 1300 including a device 1305 that supports PS for EH wireless devices in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting PS for EH wireless devices). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a base station in accordance with examples as disclosed herein. For example, the communications manager 1320 may be configured as or otherwise support a means for receiving a message from a UE, the message indicating a capability of the UE to support PS for signals received at the UE for EH by the UE. The communications manager 1320 may be configured as or otherwise support a means for receiving, based on the capability of the UE to support PS for signals received at the UE for EH by the UE, an indication of a PS factor for EH by the UE, the PS factor indicating a portion of received power for signals received at the UE to be used for EH. The communications manager 1320 may be configured as or otherwise support a means for transmitting a signal to the UE based on the capability of the UE to support PS for signals received at the UE for EH by the UE and the PS factor.

By including or configuring the communications manager 1320 in accordance with examples as described herein, the device 1305 may support techniques for improved communication reliability, more efficient utilization of communication resources, and improved coordination between devices.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of PS for EH wireless devices as described herein, or the processor 1340 and the memory 1330 may be otherwise configured to perform or support such operations.

Figure 14:
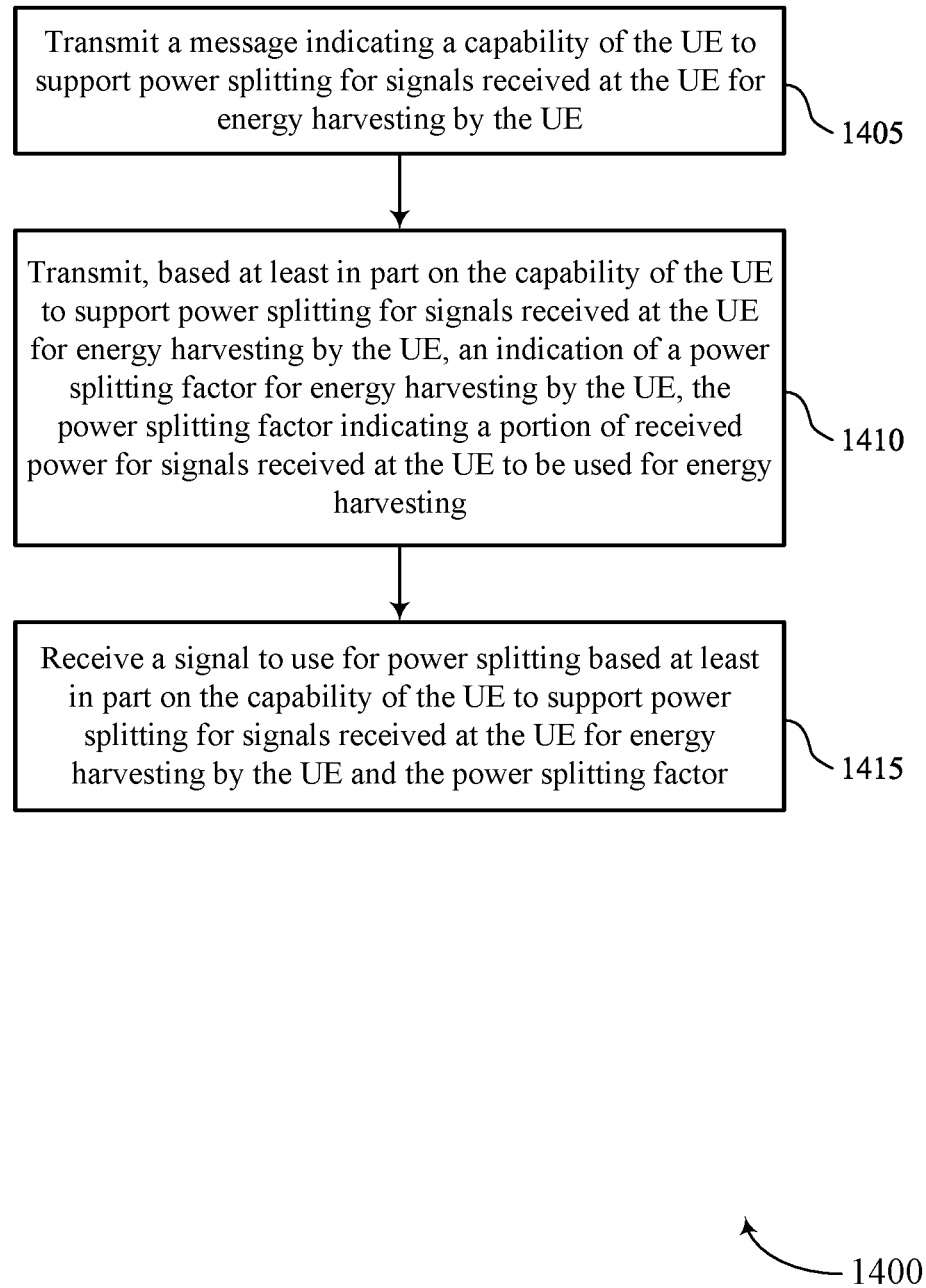
FIGS. 14 through 16 show flowcharts illustrating methods that support PS for EH wireless devices in accordance with aspects of the present disclosure.

FIG. 14 shows a flowchart illustrating a method 1400 that supports PS for EH wireless devices in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include transmitting a message indicating a capability of the UE to support PS for signals received at the UE for EH by the UE. The operations of 1405 may be performed in accordance with examples as disclosed herein. In some examples, aspects of the operations of 1405 may be performed by a PS capability component 825 as described with reference to FIG. 8.

At 1410, the method may include transmitting, based on the capability of the UE to support PS for signals received at the UE for EH by the UE, an indication of a PS factor for EH by the UE, the PS factor indicating a portion of received power for signals received at the UE to be used for EH. The operations of 1410 may be performed in accordance with examples as disclosed herein. In some examples, aspects of the operations of 1410 may be performed by a PS factor component 830 as described with reference to FIG. 8.

At 1415, the method may include receiving a signal to use for PS based on the capability of the UE to support PS for signals received at the UE for EH by the UE and the PS factor. The operations of 1415 may be performed in accordance with examples as disclosed herein. In some examples, aspects of the operations of 1415 may be performed by a PS signal component 835 as described with reference to FIG. 8.

Figure 15:
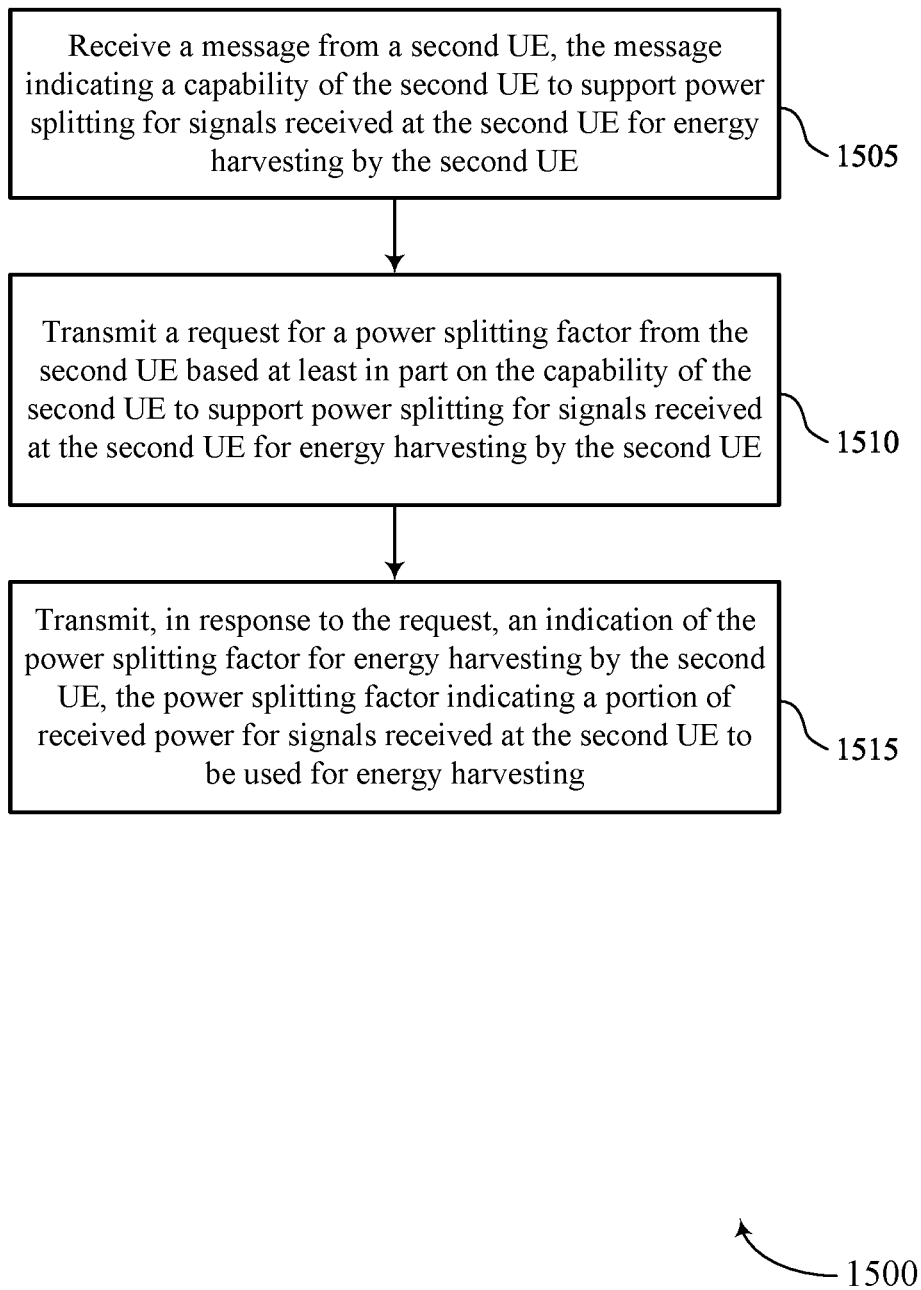

FIG. 15 shows a flowchart illustrating a method 1500 that supports PS for EH wireless devices in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving a message from a second UE, the message indicating a capability of the second UE to support PS for signals received at the second UE for EH by the second UE. The operations of 1505 may be performed in accordance with examples as disclosed herein. In some examples, aspects of the operations of 1505 may be performed by a PS capability component 825 as described with reference to FIG. 8.

At 1510, the method may include transmitting a request for a PS factor from the second UE based on the capability of the second UE to support PS for signals received at the second UE for EH by the second UE. The operations of 1510 may be performed in accordance with examples as disclosed herein. In some examples, aspects of the operations of 1510 may be performed by a PS request component 840 as described with reference to FIG. 8.

At 1515, the method may include transmitting, in response to the request, an indication of the PS factor for EH by the second UE, the PS factor indicating a portion of received power for signals received at the second UE to be used for EH. The operations of 1515 may be performed in accordance with examples as disclosed herein. In some examples, aspects of the operations of 1515 may be performed by a PS factor component 830 as described with reference to FIG. 8.

Figure 16:
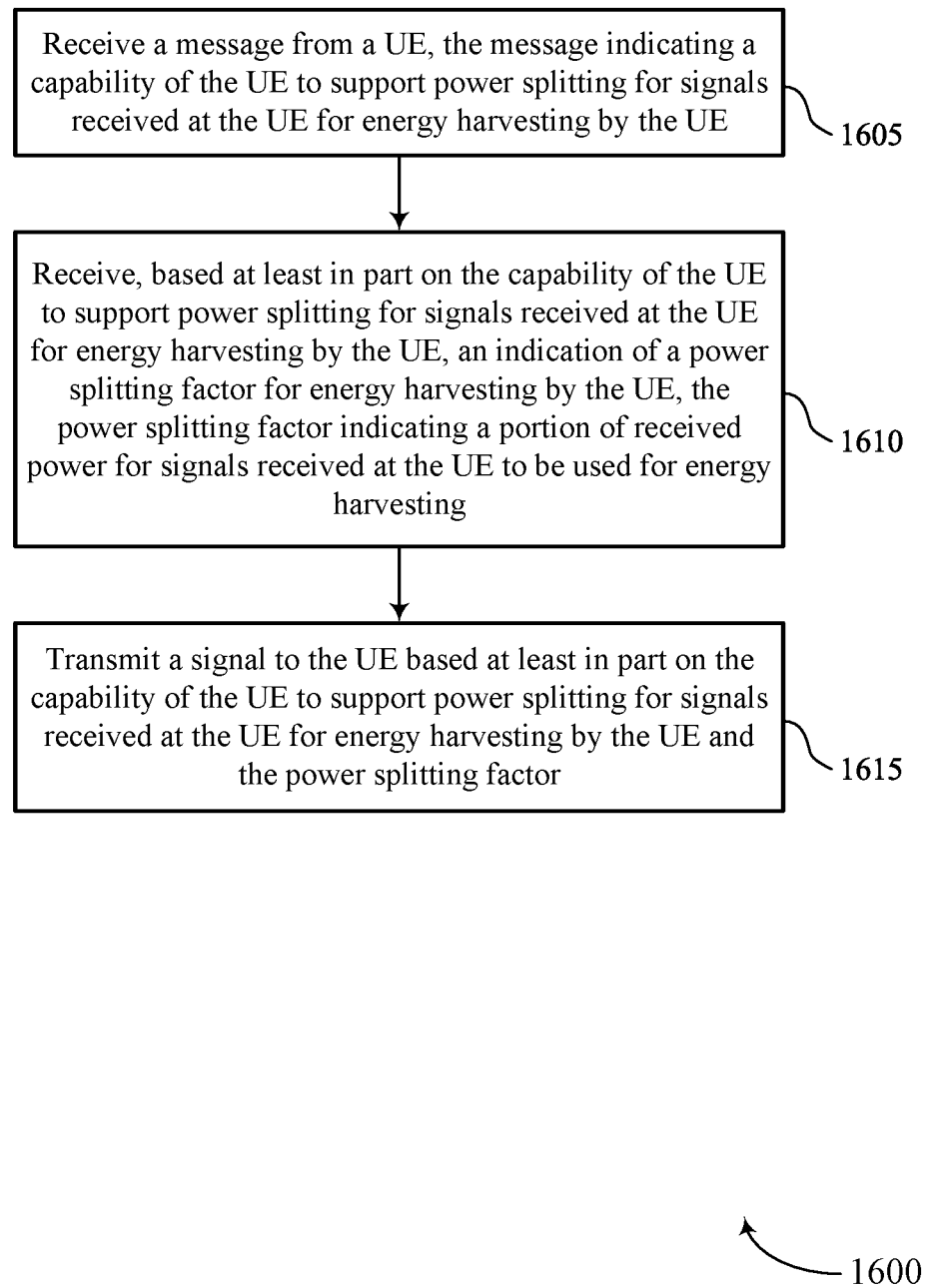

FIG. 16 shows a flowchart illustrating a method 1600 that supports PS for EH wireless devices in accordance with aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1605, the method may include receiving a message from a UE, the message indicating a capability of the UE to support PS for signals received at the UE for EH by the UE. The operations of 1605 may be performed in accordance with examples as disclosed herein. In some examples, aspects of the operations of 1605 may be performed by a PS capability module 1225 as described with reference to FIG. 12.

At 1610, the method may include receiving, based on the capability of the UE to support PS for signals received at the UE for EH by the UE, an indication of a PS factor for EH by the UE, the PS factor indicating a portion of received power for signals received at the UE to be used for EH. The operations of 1610 may be performed in accordance with examples as disclosed herein. In some examples, aspects of the operations of 1610 may be performed by a PS factor module 1230 as described with reference to FIG. 12.

At 1615, the method may include transmitting a signal to the UE based on the capability of the UE to support PS for signals received at the UE for EH by the UE and the PS factor. The operations of 1615 may be performed in accordance with examples as disclosed herein. In some examples, aspects of the operations of 1615 may be performed by a PS signal module 1235 as described with reference to FIG. 12.

The following provides an overview of aspects of the present disclosure:

Aspect 1: A method for wireless communications at a UE, comprising: transmitting a message indicating a capability of the UE to support PS for signals received at the UE for EH by the UE; transmitting, based at least in part on the capability of the UE to support PS for signals received at the UE for EH by the UE, an indication of a PS factor for EH by the UE, the PS factor indicating a portion of received power for signals received at the UE to be used for EH; and receiving a signal to use for PS based at least in part on the capability of the UE to support PS for signals received at the UE for EH by the UE and the PS factor.

Aspect 2: The method of aspect 1, wherein receiving the signal to use for PS comprises: receiving the signal from a base station or a second UE in sidelink communication with the UE, wherein a transmit power of the signal is based at least in part on the PS factor.

Aspect 3: The method of any of aspects 1 through 2, wherein transmitting the message comprises: transmitting the message to a base station in communication with the UE.

Aspect 4: The method of aspect 3, wherein receiving the signal to use for PS comprises: receiving the signal from the base station, wherein a modulation and coding scheme of the signal is based at least in part on the PS factor.

Aspect 5: The method of any of aspects 1 through 4, wherein transmitting the message comprises: transmitting the message to a second UE in sidelink communication with the UE.

Aspect 6: The method of aspect 5, further comprising: receiving a request for the PS factor from the second UE, wherein the indication of the PS factor is transmitted in response to the request.

Aspect 7: The method of any of aspects 1 through 6, further comprising: transmitting the indication of the PS factor to a base station; and refraining from using the PS factor for transmission of a sounding reference signal to the base station.

Aspect 8: The method of any of aspects 1 through 7, further comprising: receiving, from a base station, a reference signal for performing channel quality measurements at the UE; and transmitting, to the base station, a channel quality report indicating one or more channel quality measurements performed at the UE based at least in part on the PS factor.

Aspect 9: The method of any of aspects 1 through 8, further comprising: receiving, from a base station, an updated PS factor based at least in part on transmitting the indication of the PS factor to the base station; and receiving, from the base station, a modulation and coding scheme for receiving the signal based at least in part on the updated PS factor, wherein the signal is received based at least in part on the modulation and coding scheme and the updated PS factor.

Aspect 10: The method of aspect 9, further comprising: receiving a DCI message that indicates the updated PS factor, the modulation and coding scheme, or both.

Aspect 11: The method of any of aspects 1 through 10, wherein the PS factor is based at least in part on a reliability associated with a channel used for receiving the signal, a transport block size of the signal, or both.

Aspect 12: A method for wireless communications at a first UE, comprising: receiving a message from a second UE, the message indicating a capability of the second UE to support PS for signals received at the second UE for EH by the second UE; transmitting a request for a PS factor from the second UE based at least in part on the capability of the second UE to support PS for signals received at the second UE for EH by the second UE; and transmitting, in response to the request, an indication of the PS factor for EH by the second UE, the PS factor indicating a portion of received power for signals received at the second UE to be used for EH.

Aspect 13: The method of aspect 12, further comprising: transmitting a sidelink message to the second UE using a transmit power that is based at least in part on the PS factor.

Aspect 14: The method of any of aspects 12 through 13, further comprising: transmitting a sidelink message to the second UE using a modulation and coding scheme that is based at least in part on the PS factor.

Aspect 15: The method of any of aspects 12 through 14, further comprising: receiving a sidelink control message that comprises the indication of the PS factor, wherein the sidelink control message comprises a PC5 control message.

Aspect 16: A method for wireless communications at a base station, comprising: receiving a message from a UE, the message indicating a capability of the UE to support PS for signals received at the UE for EH by the UE; receiving, based at least in part on the capability of the UE to support PS for signals received at the UE for EH by the UE, an indication of a PS factor for EH by the UE, the PS factor indicating a portion of received power for signals received at the UE to be used for EH; and transmitting a signal to the UE based at least in part on the capability of the UE to support PS for signals received at the UE for EH by the UE and the PS factor.

Aspect 17: The method of aspect 16, wherein transmitting the signal comprises: transmitting the signal using a transmit power that is based at least in part on the PS factor, a modulation and coding scheme that is based at least in part on the PS factor, a rank indicator that is based at least in part on the PS factor, or any combination thereof.

Aspect 18: The method of any of aspects 16 through 17, further comprising: transmitting, to the UE, a reference signal for performing channel quality measurements at the UE; and receiving, from the UE, a channel quality report indicating one or more channel quality measurements performed at the UE based at least in part on the PS factor.

Aspect 19: The method of any of aspects 16 through 18, further comprising: receiving a sounding reference signal from the UE; and estimating the channel for communication with the UE based at least in part on the sounding reference signal and the PS factor.

Aspect 20: The method of any of aspects 16 through 19, further comprising: transmitting, to the UE, an updated PS factor based at least in part on the indication of the PS factor; and transmitting, to the UE, a modulation and coding scheme for receiving the signal based at least in part on the updated PS factor, wherein the signal is transmitting based at least in part on the modulation and coding scheme and the updated PS factor.

Aspect 21: The method of aspect 20, further comprising: transmitting a DCI message that indicates the updated PS factor, the modulation and coding scheme, or both.

Aspect 22: An apparatus for wireless communications at a UE, comprising a processor; memory coupled with the processor; and instructions stored in the memory and executable by the processor to cause the apparatus to perform a method of any of aspects 1 through 11.

Aspect 23: An apparatus for wireless communications at a UE, comprising at least one means for performing a method of any of aspects 1 through 11.

Aspect 24: A non-transitory computer-readable medium storing code for wireless communications at a UE, the code comprising instructions executable by a processor to perform a method of any of aspects 1 through 11.

Aspect 25: An apparatus for wireless communications at a first UE, comprising a processor; memory coupled with the processor; and instructions stored in the memory and executable by the processor to cause the apparatus to perform a method of any of aspects 12 through 15.

Aspect 26: An apparatus for wireless communications at a first UE, comprising at least one means for performing a method of any of aspects 12 through 15.

Aspect 27: A non-transitory computer-readable medium storing code for wireless communications at a first UE, the code comprising instructions executable by a processor to perform a method of any of aspects 12 through 15.

Aspect 28: An apparatus for wireless communications at a base station, comprising a processor; memory coupled with the processor; and instructions stored in the memory and executable by the processor to cause the apparatus to perform a method of any of aspects 16 through 21.

Aspect 29: An apparatus for wireless communications at a base station, comprising at least one means for performing a method of any of aspects 16 through 21.

Aspect 30: A non-transitory computer-readable medium storing code for wireless communications at a base station, the code comprising instructions executable by a processor to perform a method of any of aspects 16 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    transmitting a message indicating a capability of the UE to support power splitting for signals received at the UE for energy harvest (EH) by the UE;
    transmitting, based at least in part on the capability of the UE to support power splitting for signals received at the UE for EH by the UE, an indication of a power splitting factor for EH by the UE, the power splitting factor indicating a portion of received power for signals received at the UE to be used for EH; and
    receiving a signal to use for power splitting based at least in part on the capability of the UE to support power splitting for signals received at the UE for EH by the UE and the power splitting factor.

2. The method of claim 1, wherein receiving the signal to use for power splitting comprises:
    receiving the signal from a base station or a second UE in sidelink communication with the UE, wherein a transmit power of the signal is based at least in part on the power splitting factor.

3. The method of claim 1, wherein transmitting the message comprises:
    transmitting the message to a base station in communication with the UE.

4. The method of claim 3, wherein receiving the signal to use for power splitting comprises:
receiving the signal from the base station, wherein a modulation and coding scheme of the signal is based at least in part on the power splitting factor.

5. The method of claim 1, wherein transmitting the message comprises:
transmitting the message to a second UE in sidelink communication with the UE.

6. The method of claim 5, further comprising:
receiving a request for the power splitting factor from the second UE, wherein the indication of the power splitting factor is transmitted in response to the request.

7. The method of claim 1, further comprising:
transmitting the indication of the power splitting factor to a base station; and
refraining from using the power splitting factor for transmission of a sounding reference signal to the base station.

8. The method of claim 1, further comprising:
receiving, from a base station, a reference signal for performing channel quality measurements at the UE; and
transmitting, to the base station, a channel quality report indicating one or more channel quality measurements performed at the UE based at least in part on the power splitting factor.

9. The method of claim 1, further comprising:
receiving, from a base station, an updated power splitting factor based at least in part on transmitting the indication of the power splitting factor to the base station; and
receiving, from the base station, a modulation and coding scheme for receiving the signal based at least in part on the updated power splitting factor, wherein the signal is received based at least in part on the modulation and coding scheme and the updated power splitting factor.

10. The method of claim 9, further comprising:
receiving a downlink control information (DCI) message that indicates the updated power splitting factor, the modulation and coding scheme, or both.

11. The method of claim 1, wherein the power splitting factor is based at least in part on a reliability associated with a channel used for receiving the signal, a transport block size of the signal, or both.

12. A method for wireless communications at a first user equipment (UE), comprising:
receiving a message from a second UE, the message indicating a capability of the second UE to support power splitting for signals received at the second UE for energy harvest (EH) by the second UE;
transmitting a request for a power splitting factor from the second UE based at least in part on the capability of the second UE to support power splitting for signals received at the second UE for EH by the second UE; and
transmitting, in response to the request, an indication of the power splitting factor for EH by the second UE, the power splitting factor indicating a portion of received power for signals received at the second UE to be used for EH.

13. The method of claim 12, further comprising:
transmitting a sidelink message to the second UE using a transmit power that is based at least in part on the power splitting factor.

14. The method of claim 12, further comprising:
transmitting a sidelink message to the second UE using a modulation and coding scheme that is based at least in part on the power splitting factor.

15. The method of claim 12, further comprising:
receiving a sidelink control message that comprises the indication of the power splitting factor, wherein the sidelink control message comprises a PC5 control message.

16. A method for wireless communications at a base station, comprising:
receiving a message from a user equipment (UE), the message indicating a capability of the UE to support power splitting for signals received at the UE for energy harvest (EH) by the UE;
receiving, based at least in part on the capability of the UE to support power splitting for signals received at the UE for EH by the UE, an indication of a power splitting factor for EH by the UE, the power splitting factor indicating a portion of received power for signals received at the UE to be used for EH; and
transmitting a signal to the UE based at least in part on the capability of the UE to support power splitting for signals received at the UE for EH by the UE and the power splitting factor.

17. The method of claim 16, wherein transmitting the signal comprises:
transmitting the signal using a transmit power that is based at least in part on the power splitting factor, a modulation and coding scheme that is based at least in part on the power splitting factor, a rank indicator that is based at least in part on the power splitting factor, or any combination thereof.

18. The method of claim 16, further comprising:
transmitting, to the UE, a reference signal for performing channel quality measurements at the UE; and
receiving, from the UE, a channel quality report indicating one or more channel quality measurements performed at the UE based at least in part on the power splitting factor.

19. The method of claim 16, further comprising:
receiving a sounding reference signal from the UE; and
estimating a channel for communication with the UE based at least in part on the sounding reference signal and the power splitting factor.

20. The method of claim 16, further comprising:
transmitting, to the UE, an updated power splitting factor based at least in part on the indication of the power splitting factor; and
transmitting, to the UE, a modulation and coding scheme for receiving the signal based at least in part on the updated power splitting factor, wherein the signal is transmitting based at least in part on the modulation and coding scheme and the updated power splitting factor.

21. The method of claim 20, further comprising:
transmitting a downlink control information (DCI) message that indicates the updated power splitting factor, the modulation and coding scheme, or both.

22. An apparatus for wireless communications at a user equipment (UE), comprising:
a processor;
memory coupled with the processor; and
instructions stored in the memory and executable by the processor to cause the apparatus to:
transmit a message indicating a capability of the UE to support power splitting for signals received at the UE for energy harvest (EH) by the UE;

transmit, based at least in part on the capability of the UE to support power splitting for signals received at the UE for EH by the UE, an indication of a power splitting factor for EH by the UE, the power splitting factor indicating a portion of received power for signals received at the UE to be used for EH; and receive a signal to use for power splitting based at least in part on the capability of the UE to support power splitting for signals received at the UE for EH by the UE and the power splitting factor.

23. The apparatus of claim 22, wherein the instructions to receive the signal to use for power splitting are executable by the processor to cause the apparatus to:

receive the signal from a base station or a second UE in sidelink communication with the UE, wherein a transmit power of the signal is based at least in part on the power splitting factor.

24. The apparatus of claim 22, wherein the instructions to transmit the message are executable by the processor to cause the apparatus to:

transmit the message to a base station in communication with the UE.

25. The apparatus of claim 22, wherein the instructions to transmit the message are executable by the processor to cause the apparatus to:

transmit the message to a second UE in sidelink communication with the UE.

26. The apparatus of claim 22, wherein the instructions are further executable by the processor to cause the apparatus to:

transmit the indication of the power splitting factor to a base station; and refrain from using the power splitting factor for transmission of a sounding reference signal to the base station.

27. The apparatus of claim 22, wherein the instructions are further executable by the processor to cause the apparatus to:

receive, from a base station, a reference signal for performing channel quality measurements at the UE; and transmit, to the base station, a channel quality report indicating one or more channel quality measurements performed at the UE based at least in part on the power splitting factor.

28. The apparatus of claim 22, wherein the instructions are further executable by the processor to cause the apparatus to:

receive, from a base station, an updated power splitting factor based at least in part on transmitting the indication of the power splitting factor to the base station; and receive, from the base station, a modulation and coding scheme for receiving the signal based at least in part on the updated power splitting factor, wherein the signal is received based at least in part on the modulation and coding scheme and the updated power splitting factor.

29. The apparatus of claim 28, wherein the instructions are further executable by the processor to cause the apparatus to:

receive a downlink control information (DCI) message that indicates the updated power splitting factor, the modulation and coding scheme, or both.

30. The apparatus of claim 22, wherein the power splitting factor is based at least in part on a reliability associated with a channel used for receiving the signal, a transport block size of the signal, or both.

* * * * *